United States Patent
Kim et al.

(10) Patent No.: US 11,979,554 B2
(45) Date of Patent: May 7, 2024

(54) INTRA PREDICTION-BASED VIDEO SIGNAL PROCESSING METHOD AND DEVICE

(71) Applicant: HUMAX CO., LTD., Yongin-Si (KR)

(72) Inventors: Dongcheol Kim, Suwon-Si (KR); Geonjung Ko, Seoul (KR); Jaehong Jung, Seoul (KR); Juhyung Son, Uiwang-Si (KR); Jinsam Kwak, Uiwang-si (KR)

(73) Assignee: HUMAX CO., LTD., Yongin-Si (KR)

( * ) Notice: Subject to any disclaimer, the term of this patent is extended or adjusted under 35 U.S.C. 154(b) by 290 days.

(21) Appl. No.: 17/401,923

(22) Filed: Aug. 13, 2021

(65) Prior Publication Data

US 2021/0377519 A1    Dec. 2, 2021

Related U.S. Application Data

(63) Continuation of application No. PCT/KR2020/002920, filed on Feb. 28, 2020.

(30) Foreign Application Priority Data

Feb. 28, 2019  (KR) .................. 10-2019-0024368
Mar. 27, 2019  (KR) .................. 10-2019-0035438

(51) Int. Cl.
H04N 19/105    (2014.01)
H04N 19/119    (2014.01)
H04N 19/176    (2014.01)

(52) U.S. Cl.
CPC ......... *H04N 19/105* (2014.11); *H04N 19/119* (2014.11); *H04N 19/176* (2014.11)

(58) Field of Classification Search
None
See application file for complete search history.

(56) References Cited

U.S. PATENT DOCUMENTS

2015/0172658 A1    6/2015  Kim et al.
2017/0019686 A1    1/2017  Chiu et al.
(Continued)

FOREIGN PATENT DOCUMENTS

CN    108712650 A    10/2018
JP    2022-504552 A    1/2022
(Continued)

OTHER PUBLICATIONS

Chen et al., "Algorithm Description of Joint Exploration Test model 7 (JEM 7)", JVET-G1001-v1, Jul. 13-21, 2017. (Year: 2017).*
(Continued)

*Primary Examiner* — James M Anderson, II
(74) *Attorney, Agent, or Firm* — BROADVIEW IP LAW, PC

(57) ABSTRACT

Disclosed are a video signal processing method and device whereby a video signal is encoded or decoded. The video signal processing method may comprise the steps of: determining whether an intra sub-partition (ISP) mode is applicable to a current block; if the ISP mode is applicable to the current block, splitting the current block into a plurality of rectangular transform blocks in the horizontal or vertical direction; generating prediction blocks of the transform blocks by carrying out intra prediction on each of the transform blocks; and reconstructing the current block on the basis of residual blocks of the transform blocks, and the prediction blocks.

15 Claims, 13 Drawing Sheets

(56) References Cited

U.S. PATENT DOCUMENTS

| | | | |
|---|---|---|---|
| 2018/0063552 A1 | 3/2018 | Kim et al. | |
| 2018/0176587 A1 | 6/2018 | Panusopone et al. | |
| 2018/0249179 A1 | 8/2018 | Han et al. | |
| 2018/0302631 A1 | 10/2018 | Chiang et al. | |
| 2018/0332284 A1 | 11/2018 | Liu et al. | |
| 2019/0313102 A1 | 10/2019 | Cho et al. | |
| 2021/0314619 A1 | 10/2021 | Jung et al. | |
| 2021/0360240 A1* | 11/2021 | Lee | H04N 19/159 |
| 2022/0132109 A1* | 4/2022 | Choi | H04N 19/463 |
| 2022/0191546 A1 | 6/2022 | Koo et al. | |

FOREIGN PATENT DOCUMENTS

| | | | |
|---|---|---|---|
| KR | 10-2010-0095992 A | 9/2010 | |
| KR | 10-2017-0117112 A | 10/2017 | |
| KR | 10-2018-0040126 A | 4/2018 | |
| KR | 10-2018-0063201 A | 6/2018 | |
| KR | 10-2018-0122362 A | 11/2018 | |
| WO | 2016/129980 A1 | 8/2016 | |
| WO | 2018/038554 A1 | 3/2018 | |
| WO | 2019/235797 A1 | 12/2019 | |
| WO | 2020/159316 A1 | 8/2020 | |
| WO | 2020/260313 A1 | 12/2020 | |

OTHER PUBLICATIONS

Non-Final Office Action for U.S. Appl. No. 17/348,227 by United States Patent & Trademark Office dated Jun. 27, 2022.
International Search Report & Written Opinion for PCT/KR2020/001853 by Korean Intellectual Property Office dated May 20, 2020.
Non-Final Office Action for IN202127037310 by Intellectual Property India dated Mar. 25, 2022.
Santiago De-Luxán-Hernández et al., CE3: Intra Sub-Partitions Coding Mode (Tests 1.1.1 and 1.1.2), JVET-M0102-v5, Joint Video Experts Team (JVET) of ITU-T SG 16 WP 3 and ISO/IEC JTC 1/SC 29/WG 11 13th Meeting: Marrakech, MA, Jan. 9-18, 2019.
Moonmo Koo et al., CE 6-5.1: Reduced Secondary Transform (RST), JVET-M0292, Joint Video Experts Team (JVET) of ITU-T SG 16 WP 3 and ISO/IEC JTC 1/SC 29/WG 11 13th Meeting: Marrakech, MA, Jan. 9-18, 2019.
Moonmo Koo et al., CE6: Reduced Secondary Transform (RST) (CE6-3.1), JVET-N0193, Joint Video Experts Team (JVET) of ITU-T SG 16 WP 3 and ISO/IEC JTC 1/SC 29/WG 11 14th Meeting: Geneva, CH, Mar. 19-27, 2019.
U.S. Appl. No. 62/834,487, filed Apr. 16, 2019.
"Notice of Reasons for Refusal" for JP2021-550241 by Japan Patent Office dated Sep. 27, 2022.
De-Luxan-Hernandez, Santiago et al.,CE3: Intra Sub-Partitions Coding Mode (Tests 1.1.1 and 1.1.2),Joint Video Experts Team (JVET) of ITU-TSG 16 WP 3 and ISO/IEC JTC 1/SC 29/WG 11 13th Meeting: Marrakech, MA, Jan. 9-18, 2019, [JVET-M0102-v2],JVET-M0102 (version 2),ITU-T,Jan. 2, 2019,<URL:http://phenix.it-sudparis.eu/jvet/doc_end_user/documents/13_Marrakech/wg11/JVET-M0102-v2.zip>: JVET-M0102_v1.docx.
Li, Ling et al.,Non-CE3: block size restriction on PDPC,Joint Video Experts Team (JVET) of ITU-T SG 16 WP 3 and ISO/IEC JTC 1/SC 29/WG 1113th Meeting: Marrakech, MA, Jan. 9-18, 2019, [JVET-M0814-v5],JVET-M0814 (version 7),ITU-T,Jan. 16, 2019,<URL:http://phenix.it-sudparis.eu/jvet/doc_end_user/documents/13_Marrakech/wg11/JVET-M0814-v7.zip>: JVET-M0814-v7.docx.
Chen, Jianle et al.,Algorithm Description of Joint Exploration Test Model 7 (JEM 7),Joint Video Exploration Team (JVET) of ITU-T SG 16 WP 3 and ISO/IEC JTC 1/SC 29/WG 11 7th Meeting: Torino, IT, Jul. 13-21, 2017 , [JVET-G1001-v1],JVET-G1001 (version 1),ITU-T,Aug. 19, 2017,<URL: http://phenix.it-sudparis.eu/jvet/doc_end_user/documents/7_Torino/wg11/JVET-G1001-v1.zip>: JVET-G1001-v1.docx.
"Notice of Allowance and Fee(s) Due" for U.S. Appl. No. 17/348,227 by United States Patent and Trademark Office dated Nov. 2, 2022.
International Search Report & Written Opinion of the International Searching Authority dated Jun. 16, 2020.
Non-Final Office Action for U.S. Appl. No. 18/164,460 by United States Patent and Trademark Office dated Sep. 14, 2023.
Office Action for CN 202080016690.3 by China National Intellectual Property Administration dated Dec. 6, 2023.
Hearing Notice for IN 202127037310 by Intellectual Property India dated Dec. 19, 2023.
Notice of Allowance for U.S. Appl. No. 18/164,460 by United States Patent and Trademark Office dated Dec. 28, 2023.

\* cited by examiner (a)  (b)

(a)  (b)

Fig.17
| predModeIntra | lfnstTrSetIdx |
|---|---|
| predModeIntra < 0 | 1 |
| 0 <= predModeIntra <= 1 | 0 |
| 2 <= predModeIntra <= 12 | 1 |
| 13 <= predModeIntra <= 23 | 2 |
| 24 <= predModeIntra <= 44 | 3 |
| 45 <= predModeIntra <= 55 | 2 |
| 56 <= predModeIntra <= 80 | 1 |
Fig.18
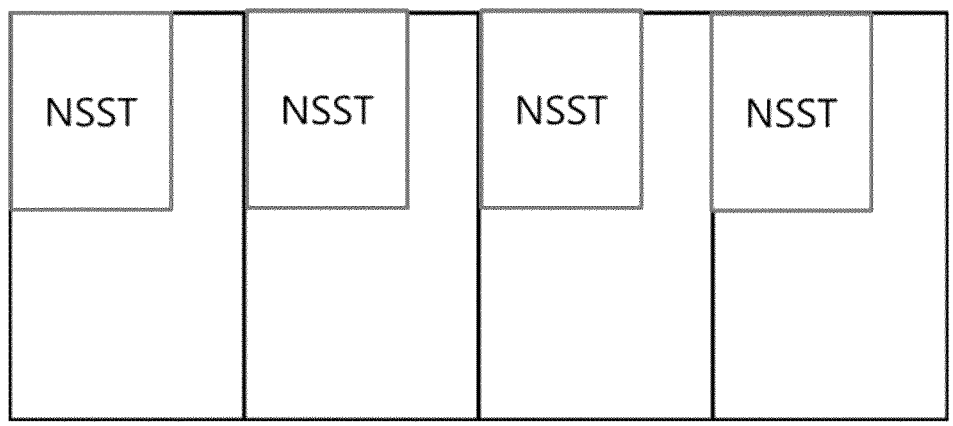
Fig.19
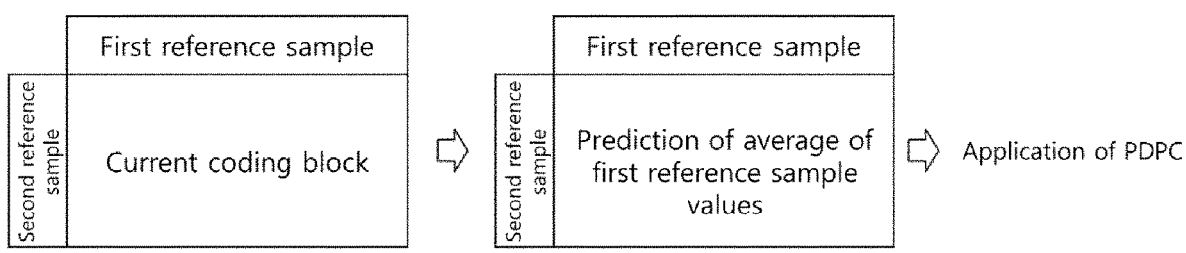

INTRA PREDICTION-BASED VIDEO SIGNAL PROCESSING METHOD AND DEVICE

CROSS-REFERENCE TO RELATED APPLICATIONS

This application is a continuation of pending PCT International Application No. PCT/KR2020/002920, which was filed on Feb. 28, 2020, and which claims priority under 35 U.S.C. 119(a) to Korean Patent Application No. 10-2019-0024368 filed with the Korean Intellectual Property Office on Feb. 28, 2019, and Korean Patent Application No. 10-2019-0035438 filed with the Korean Intellectual Property Office on Mar. 27, 2019. The disclosures of the above patent applications are incorporated herein by reference in their entirety.

TECHNICAL FIELD

The present disclosure relates to a video signal processing method and device and, more specifically, to a video signal processing method and device by which a video signal is encoded or decoded based on intra prediction.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DISCLOSURE OF INVENTION

Technical Problem

An aspect of the present disclosure is to improve a video signal coding efficiency. Specifically, the present disclosure proposes a method for performing a position-dependent intra prediction combination (PDPC) and a low-frequency non-separable transform (LFNST) in a unit in which prediction and reconstruction are performed according to the application of intra sub-partition.

Solution to Problem

In view of the foregoing, the present disclosure provides a video signal processing device and a video signal processing method as follows.

According to an embodiment of the present disclosure, a video signal processing method may include: determining whether an intra sub-partition (ISP) mode is applied to a current block; when the ISP mode is applied to the current block, dividing the current block into multiple horizontal or vertical rectangular transform blocks; generating prediction blocks of the transform blocks by performing intra prediction on each of the transform blocks; and reconstructing the current block, based on residual blocks of the transform blocks and the prediction blocks, wherein the generating of the prediction blocks includes performing position-dependent intra prediction sample filtering in a unit of the transform blocks obtained by dividing the current block.

As an embodiment, the generating of the prediction blocks may further include determining whether to apply the position-dependent intra prediction sample filtering, based on at least one of a width and a height of each of the transform blocks.

As an embodiment, the determining of whether to apply the position-dependent intra prediction sample filtering may include, if the width of each of the transform blocks is equal to or larger than a pre-configured reference value, and the height of each of the transform blocks is equal to or larger than the pre-configured reference value, determining to apply the position-dependent intra prediction sample filtering.

As an embodiment, the residual blocks of the transform blocks may be derived by performing an inverse secondary transform and an inverse primary transform in a unit of the transform blocks.

As an embodiment, the method may further include: determining whether a secondary transform is applied to the current block; when the secondary transform is applied to the current block, deriving a secondary transform kernel set applied to the current block among secondary transform kernel sets which are predefined based on an intra prediction mode of the current block; determining a secondary transform kernel applied to the current block in the determined secondary transform kernel set; generating secondary-inverse-transformed blocks of the transform blocks by performing an inverse secondary transform in a unit of the transform blocks; and generating the residual blocks of the transform blocks by performing an inverse primary transform on the secondary-inverse-transformed blocks.

An embodiment of the present disclosure provides a video signal processing device including a processor, wherein the processor is configured to: determine whether an intra sub-partition (ISP) mode is applied to a current block; when the ISP mode is applied to the current block, divides the current block into multiple horizontal or vertical rectangular transform blocks; generate prediction blocks of the transform blocks by performing intra prediction on each of the transform blocks; and reconstruct the current block, based on residual blocks of the transform blocks and the prediction blocks, and the processor is configured to perform position-dependent intra prediction sample filtering in a unit of the transform blocks obtained by dividing the current block.

As an embodiment, the processor may determine whether to apply the position-dependent intra prediction sample filtering, based on at least one of a width and a height of each of the transform blocks.

As an embodiment, the processor may determine to apply the position-dependent intra prediction sample filtering if the width of each of the transform blocks is equal to or larger than a pre-configured reference value and the height of each of the transform blocks is equal to or larger than the pre-configured reference value.

As an embodiment, the residual blocks of the transform blocks may be derived by performing an inverse secondary transform and an inverse primary transform in a unit of the transform blocks.

As an embodiment, the processor may: determine whether a secondary transform is applied to the current block; if the secondary transform is applied to the current block, derive a secondary transform kernel set applied to the current block among secondary transform kernel sets which are predefined based on an intra prediction mode of the current block;

determine a secondary transform kernel applied to the current block in the determined secondary transform kernel set; perform an inverse secondary transform in a unit of the transform blocks to generate secondary-inverse-transformed blocks of the transform blocks; and generate the residual blocks of the transform blocks by performing an inverse primary transform on the secondary-inverse-transformed blocks.

An embodiment of the present disclosure provides a video signal processing method including: determining whether an intra sub-partition (ISP) mode is applied to a current block; when the ISP mode is applied to the current block, dividing the current block into multiple horizontal or vertical rectangular transform blocks; generating prediction blocks of the transform blocks by performing intra prediction on each of the transform blocks; and generate residual blocks of the transform blocks by subtracting the prediction blocks from original blocks, wherein the generating of the prediction blocks includes performing position-dependent intra prediction sample filtering in a unit of the transform blocks obtained by dividing the current block.

An embodiment of the present disclosure provides a non-transitory computer-readable medium in which a computer-executable component configured to be executed by one or more processors of a computing device is stored, wherein the computer-executable component: determines whether an intra sub-partition (ISP) mode is applied to a current block; if the ISP mode is applied to the current block, divides the current block into multiple horizontal or vertical rectangular transform blocks; generates prediction blocks of the transform blocks by performing intra prediction on each of the transform blocks; and reconstructs the current block, based on residual blocks of the transform blocks and the prediction blocks, and the computer-executable component performs position-dependent intra prediction sample filtering in a unit of the transform blocks obtained by dividing the current block.

Advantageous Effects of Invention

According to an embodiment of the present disclosure, a video signal coding efficiency can be improved. In addition, according to an embodiment of the present disclosure, a position-dependent intra prediction combination (PDPC) and an LFNST are performed in a unit of transform blocks divided by intra sub-partition, so that the accuracy of prediction can be increased, and a compression performance can be improved.

BRIEF DESCRIPTION OF DRAWINGS

FIG. 17 is a diagram illustrating a method for selecting a transform kernel used for a secondary transform according to an embodiment of the present disclosure.

FIG. 18 is a diagram illustrating an example of a method for applying a secondary transform in a unit of transform blocks according to an embodiment of the present disclosure.

FIG. 19 is a diagram illustrating a method for applying a PDPC to a current coding block to which an intra prediction mode has been applied according to an embodiment to which the present disclosure is applied.

BEST MODE FOR CARRYING OUT THE INVENTION

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and in this case, their meanings are described in a corresponding description part of the present invention. Accordingly, terms used in this specification should be interpreted based on the substantial meanings of the terms and contents over the whole specification.

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including both a luma component and a chroma component. In addition, 'block' refers to an image region including a specific component among luma components and chroma components (i.e., Cb and Cr). However, depending on the embodiment, terms such as 'unit', 'block', 'partition' and 'region' may be used interchangeably. In addition, in this specification, a unit may be used as a concept including all of a coding unit, a prediction unit, and a transform unit. The picture indicates a field or frame, and according to an embodiment, the terms may be used interchangeably.

Figure 1:
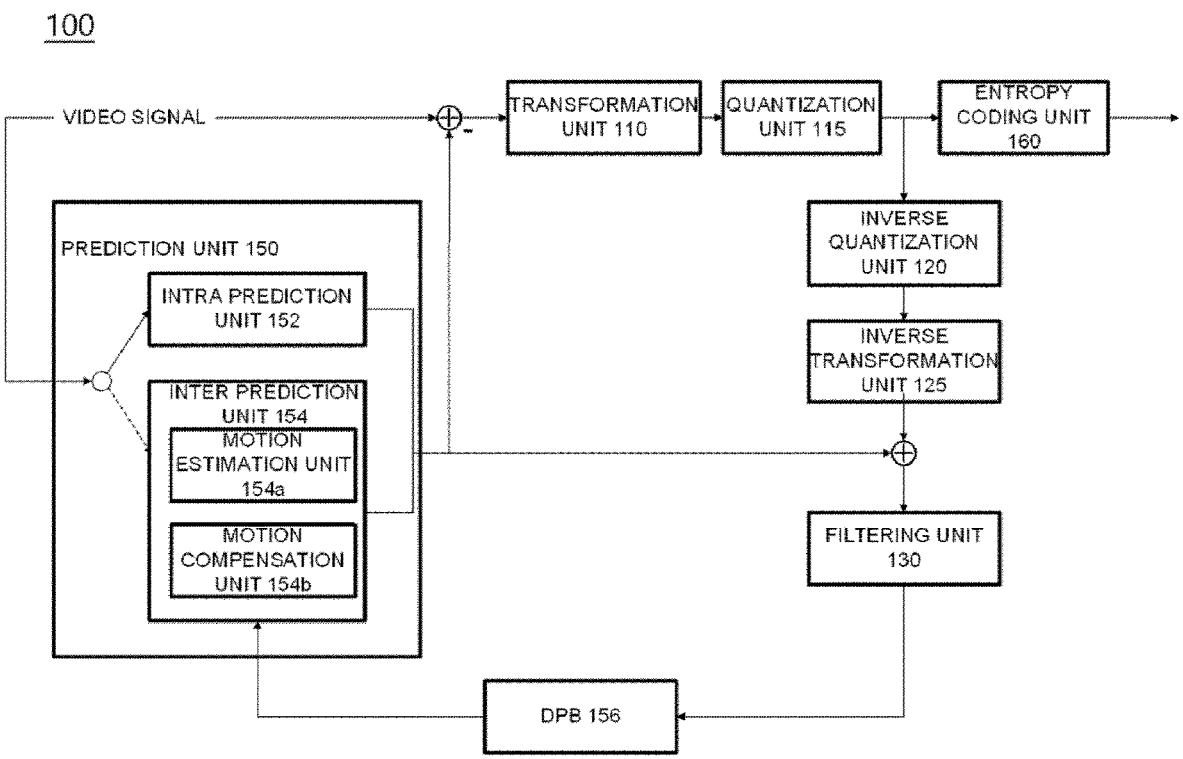
FIG. 1 is a schematic block diagram of a video signal encoding apparatus according to an embodiment of the present invention.

FIG. 1 is a schematic block diagram of a video signal encoding apparatus according to an embodiment of the present invention. Referring to FIG. 1, the encoding apparatus 100 of the present invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform can be used. The DCT and DST perform transformation by splitting the input picture signal into blocks. In the transformation, coding efficiency may vary according to the distribution and characteristics of values in the transformation region. The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that can be used in the decoder should be used when performing prediction in the encoder. For this, the encoder performs a process of reconstructing the encoded current block again. The inverse quantization unit 120 inverse-quantizes the value of the transform coefficient, and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

In order to improve coding efficiency, a picture signal is not coded as it is, but a method of predicting a picture via the prediction unit 150 by using a region that has been already coded, and adding, to the predicted picture, a residual value between an original picture and the predicted picture, thereby obtaining a reconstructed picture. The intra prediction unit 152 performs intra prediction within a current picture, and the inter prediction unit 154 predicts the current picture by using a reference picture stored in the decoding picture buffer 156. The intra prediction unit 152 performs intra prediction from reconstructed regions in the current picture, and transfers intra coding information to the entropy coding unit 160. The inter prediction unit 154 may include a motion estimation unit 154a and a motion compensation unit 154b. The motion estimation unit 154a obtains a motion vector value of the current region by referring to a specific reconstructed region. The motion estimation unit 154a transfers location information (reference frame, motion vector, etc.) of the reference region to the entropy coding unit 160 so as to enable the location information to be included in a bitstream. The motion compensation unit 154b performs inter motion compensation by using the motion vector value transferred from the motion estimation unit 154a.

The prediction unit 150 includes an intra prediction unit 152 and an inter prediction unit 154. The intra prediction unit 152 performs intra prediction in the current picture, and the inter prediction unit 154 performs inter prediction to predict the current picture by using the reference picture stored in the DBP 156. The intra prediction unit 152 performs intra prediction from reconstructed samples in the current picture, and transfers intra encoding information to the entropy coding unit 160. The intra encoding information may include at least one of an intra prediction mode, a most probable mode (MPM) flag, and an MPM index. The intra encoding information may include information on a reference sample. The inter prediction unit 154 may include the motion estimation unit 154a and the motion compensation unit 154b. The motion estimation unit 154a obtains a motion vector value of the current region by referring to a specific region of the reconstructed reference picture. The motion estimation unit 154a transfers a motion information set (reference picture index, motion vector information, etc.) for the reference region to the entropy coding unit 160. The motion compensation unit 154b performs motion compensation by using the motion vector value transferred from the motion estimation unit 154a. The inter prediction unit 154 transfers inter encoding information including motion information on the reference region to the entropy coding unit 160.

According to an additional embodiment, the prediction unit 150 may include an intra-block copy (BC) prediction unit (not shown). The intra-BC prediction unit performs intra-BC prediction based on reconstructed samples in the current picture, and transmits intra-BC encoding information to the entropy coding unit 160. The intra-BC prediction unit obtains a block vector value indicating a reference area used for predicting a current area with reference to a specific area in the current picture. The intra-BC prediction unit may perform intra-BC prediction using the obtained block vector value. The intra-BC prediction unit transmits intra-BC encoding information to the entropy coding unit 160. The intra-BC encoding information may include block vector information.

When the picture prediction described above is performed, the transformation unit 110 transforms a residual value between the original picture and the predicted picture to obtain a transform coefficient value. In this case, the transformation may be performed in a specific block unit within a picture, and the size of a specific block may be varied within a preset range. The quantization unit 115 quantizes the transform coefficient value generated in the transformation unit 110 and transmits it to the entropy coding unit 160.

The entropy coding unit 160 entropy-codes information indicating a quantized transform coefficient, intra-encoding information, inter-encoding information, and the like to generate a video signal bitstream. In the entropy coding unit 160, a variable length coding (VLC) scheme, an arithmetic coding scheme, etc. may be used. The variable length coding (VLC) scheme includes transforming input symbols into consecutive codewords, and a length of a codeword may be variable. For example, frequently occurring symbols are represented by a short codeword, and infrequently occurring symbols are represented by a long codeword. A context-based adaptive variable length coding (CAVLC) scheme may be used as a variable length coding scheme. Arithmetic coding may transform continuous data symbols into a single prime number, wherein arithmetic coding may obtain an optimal bit required for representing each symbol. A context-based adaptive binary arithmetic code (CABAC) may be used as arithmetic coding. For example, the entropy coding unit 160 may binarize information indicating a quantized transform coefficient. The entropy coding unit 160 may generate a bitstream by arithmetic-coding the binary information.

The generated bitstream is encapsulated using a network abstraction layer (NAL) unit as a basic unit. The NAL unit includes an integer number of coded coding tree units. In order to decode a bitstream in a video decoder, first, the bitstream must be separated in NAL units, and then each separated NAL unit must be decoded. Meanwhile, information necessary for decoding a video signal bitstream may be transmitted through an upper level set of Raw Byte Sequence Payload (RBSP) such as Picture Parameter Set (PPS), Sequence Parameter Set (SPS), Video Parameter Set (VPS), and the like.

Meanwhile, the block diagram of FIG. 1 shows an encoding apparatus 100 according to an embodiment of the present invention, and separately displayed blocks logically distinguish and show the elements of the encoding apparatus 100. Accordingly, the elements of the above-described encoding apparatus 100 may be mounted as one chip or as a plurality of chips depending on the design of the device. According to an embodiment, the operation of each element of the above-described encoding apparatus 100 may be performed by a processor (not shown).

Figure 2:
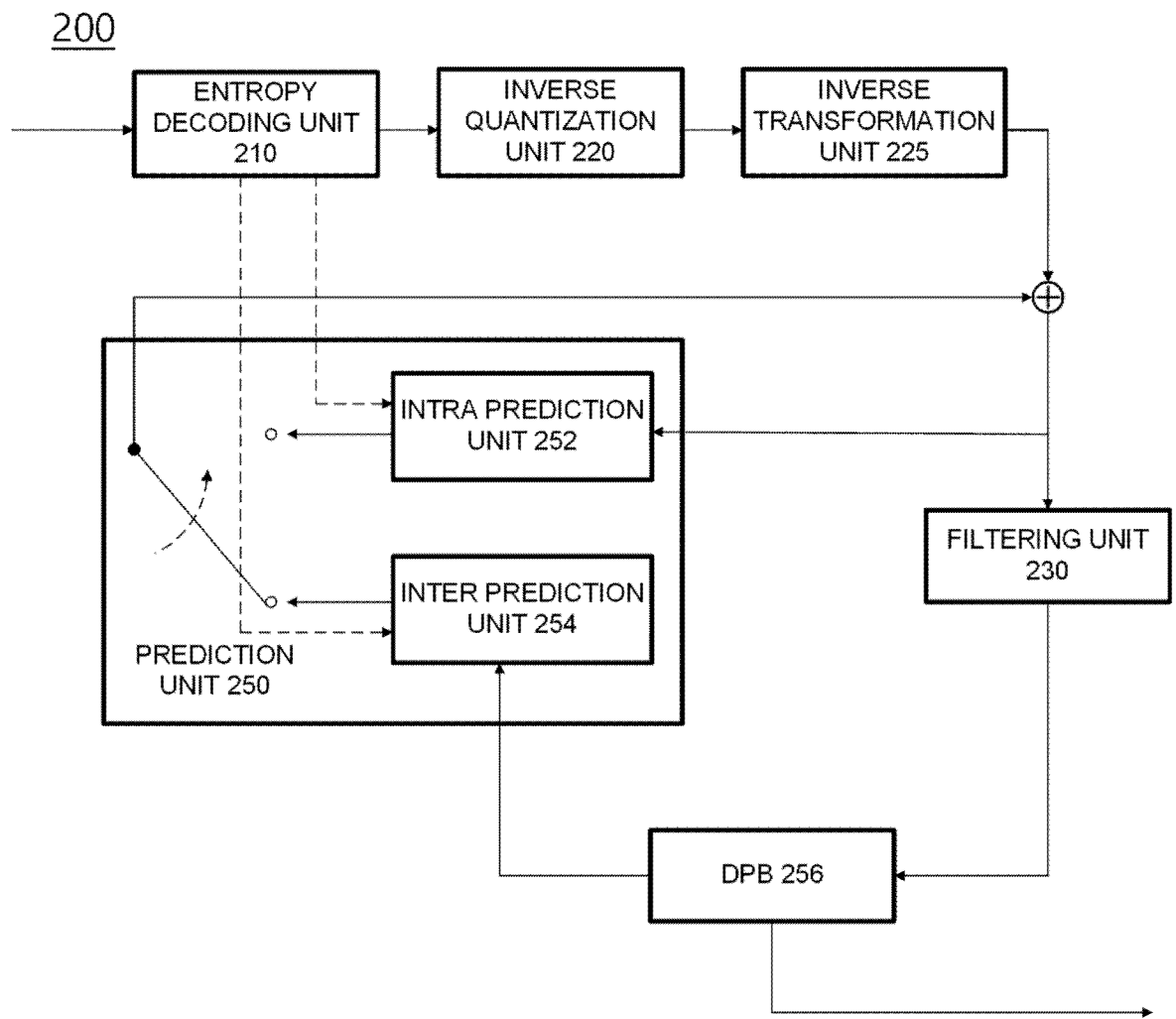
FIG. 2 is a schematic block diagram of a video signal decoding apparatus according to an embodiment of the present invention.

FIG. 2 is a schematic block diagram of a video signal decoding apparatus 200 according to an embodiment of the present invention. Referring to FIG. 2, the decoding apparatus 200 of the present invention includes an entropy decoding unit 210, an inverse quantization unit 220, an inverse transformation unit 225, a filtering unit 230, and a prediction unit 250.

The entropy decoding unit 210 entropy-decodes a video signal bitstream to extract transform coefficient information, intra encoding information, inter encoding information, and the like for each region. For example, the entropy decoding unit 210 may obtain a binarization code for transform coefficient information of a specific region from the video signal bitstream. The entropy decoding unit 210 obtains a quantized transform coefficient by inverse-binarizing a binary code. The inverse quantization unit 220 inverse-quantizes the quantized transform coefficient, and the inverse transformation unit 225 restores a residual value by using the inverse-quantized transform coefficient. The video signal processing device 200 restores an original pixel value by summing the residual value obtained by the inverse transformation unit 225 with a prediction value obtained by the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. In a reconstruction, only a current picture, that is, a picture (or, tile/slice) that performs intra prediction or intra BC prediction, is called an intra picture or an I picture (or, tile/slice), and a picture (or, tile/slice) that can perform all of intra prediction, inter prediction, and intra BC prediction is called an inter picture (or, tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and reconstructed samples in the current picture. As described above, the intra encoding information may include at least one of an intra prediction mode, a Most Probable Mode (MPM) flag, and an MPM index. The intra prediction unit 252 predicts the sample values of the current block by using the reconstructed samples located on the left and/or upper side of the current block as reference samples. In this disclosure, reconstructed samples, reference samples, and samples of the current block may represent pixels. Also, sample values may represent pixel values.

According to an embodiment, the reference samples may be samples included in a neighboring block of the current block. For example, the reference samples may be samples adjacent to a left boundary of the current block and/or samples may be samples adjacent to an upper boundary. Also, the reference samples may be samples located on a line within a predetermined distance from the left boundary of the current block and/or samples located on a line within a predetermined distance from the upper boundary of the current block among the samples of neighboring blocks of the current block. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information set (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures may be displayed (or outputted) both before and after the current picture in time aspect. According to an embodiment, two reference regions used in the bi-prediction scheme may be regions selected from picture list L0 and picture list L1, respectively.

The inter prediction unit 254 may obtain a reference block of the current block using a motion vector and a reference picture index. The reference block is in a reference picture corresponding to a reference picture index. Also, a sample value of a block specified by a motion vector or an interpolated value thereof can be used as a predictor of the current block. For motion prediction with sub-pel unit pixel accuracy, for example, an 8-tap interpolation filter for a luma signal and a 4-tap interpolation filter for a chroma signal can be used. However, the interpolation filter for motion prediction in sub-pel units is not limited thereto. In this way, the inter prediction unit 254 performs motion compensation to predict the texture of the current unit from motion pictures reconstructed previously. In this case, the inter prediction unit may use a motion information set.

According to an additional embodiment, the prediction unit 250 may include an intra BC prediction unit (not shown). The intra BC prediction unit may reconstruct the current region by referring to a specific region including reconstructed samples in the current picture. The intra BC prediction unit obtains intra BC encoding information for the current region from the entropy decoding unit 210. The intra BC prediction unit obtains a block vector value of the current region indicating the specific region in the current picture. The intra BC prediction unit may perform intra BC prediction by using the obtained block vector value. The intra BC encoding information may include block vector information.

The reconstructed video picture is generated by adding the predict value outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

Figure 3:
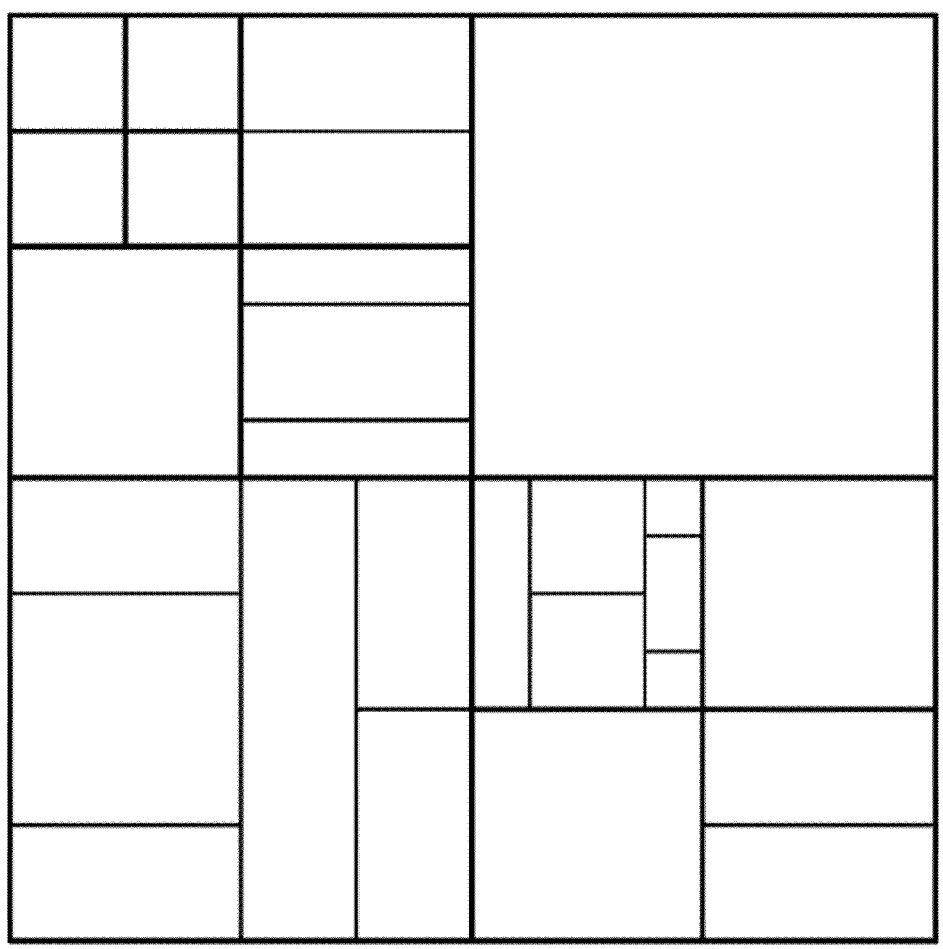
FIG. 3 shows an embodiment in which a coding tree unit is divided into coding units in a picture.

FIG. 3 illustrates an embodiment in which a coding tree unit (CTU) is split into coding units (CUs) in a picture. In the coding process of a video signal, a picture may be split into a sequence of coding tree units (CTUs). The coding tree unit is composed of an N×N block of luma samples and two blocks of chroma samples corresponding thereto. The coding tree unit can be split into a plurality of coding units. The coding tree unit is not split and may be a leaf node. In this case, the coding tree unit itself may be a coding unit. The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split can be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal ternary split. This multi-type tree split can be performed recursively.

The leaf node of the multi-type tree can be a coding unit. If splitting for the coding unit is not indicated or the coding unit is not large for the maximum transform length, the coding unit is used as a unit of prediction and transform without further division. On the other hand, at least one of the following parameters in the above-described quad tree and multi-type tree may be predefined or transmitted through a higher level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTtSize: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

Figure 4:
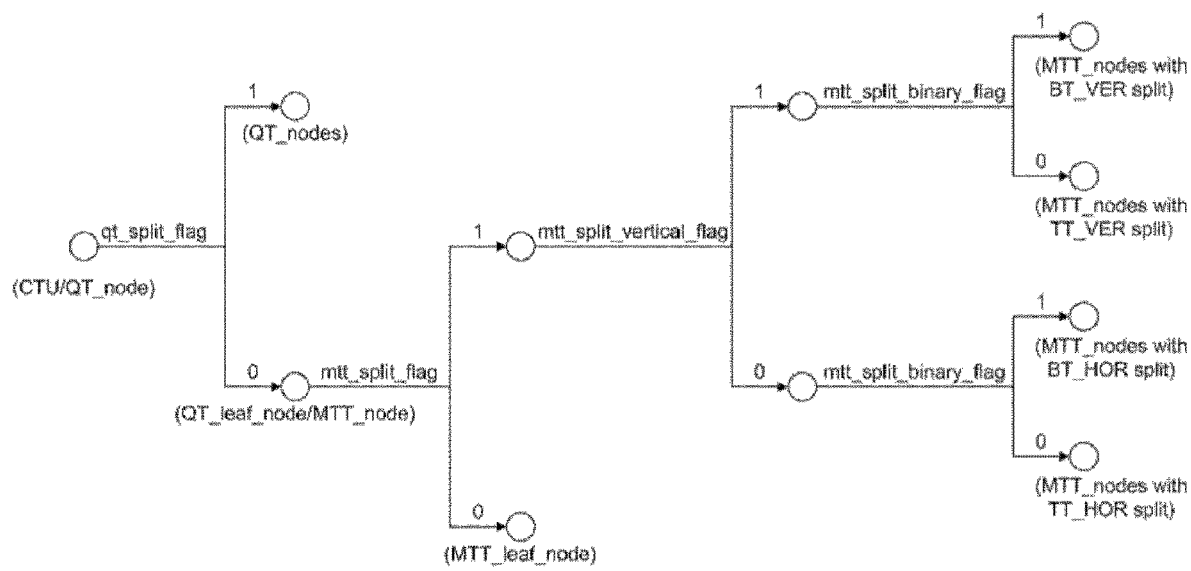
FIG. 4 shows an embodiment of a method for signaling a division of a quad tree and a multi-type tree.

FIG. 4 shows an embodiment of a method for signaling the split of a quad tree and a multi-type tree. Preset flags may be used to signal the split of the above-described quad tree and multi-type tree. Referring to FIG. 4, at least one of a flag 'qt_split_flag' indicating whether to split the quad tree node, a flag 'mtt_split_flag' indicating whether to split the multi-type tree node, a flag 'mtt_split_vertical_flag' indicating a split direction of a multi-type tree node, or a flag 'mtt_split_binary_flag' indicating a split shape of a multi-type tree node may be used.

According to an embodiment of the present invention, the coding tree unit is a root node of a quad tree, and can be first split into a quad tree structure. In the quad tree structure, 'qt_split_flag' is signaled for each node 'QT_node'. If the value of 'qt_split_flag' is 1, the node is split into 4 square nodes, and if the value of 'qt_split_flag' is 0, the corresponding node becomes the leaf node 'QT leaf node' of the quad tree.

Each quad tree leaf node 'QT leaf node' may be further split into a multi-type tree structure. In the multi-type tree structure, 'mtt_split_flag' is signaled for each node 'MTT_node'. When the value of 'mtt_split_flag' is 1, the corresponding node is split into a plurality of rectangular nodes, and when the value of 'mtt_split_flag' is 0, the corresponding node is a leaf node 'MTT leaf node' of the multi-type tree. When the multi-type tree node 'MTT_node' is split into a plurality of rectangular nodes (i.e., when the value of 'mtt_split_flag' is 1), 'mtt_split_vertical_flag' and 'mtt_split_binary_flag' for the node 'MTT_node' may be additionally signaled. When the value of 'mtt_split_vertical_flag' is 1, vertical split of node 'MTT_node' is indicated, and when the value of 'mtt_split_vertical_flag' is 0, horizontal split of node 'MTT_node' is indicated. In addition, when the value of 'mtt_split_binary_flag' is 1, the node 'MTT_node' is split into 2 rectangular nodes, and when the value of 'mtt_split_binary_flag' is 0, the node 'MTT_node' is split into 3 rectangular nodes.

Picture prediction (motion compensation) for coding is performed on a coding unit that is no longer divided (i.e., a leaf node of a coding unit tree). Hereinafter, the basic unit for performing the prediction will be referred to as a "prediction unit" or a "prediction block".

Hereinafter, the term "unit" used herein may replace the prediction unit, which is a basic unit for performing prediction. However, the present disclosure is not limited thereto, and "unit" may be understood as a concept broadly encompassing the coding unit.

Figure 5:
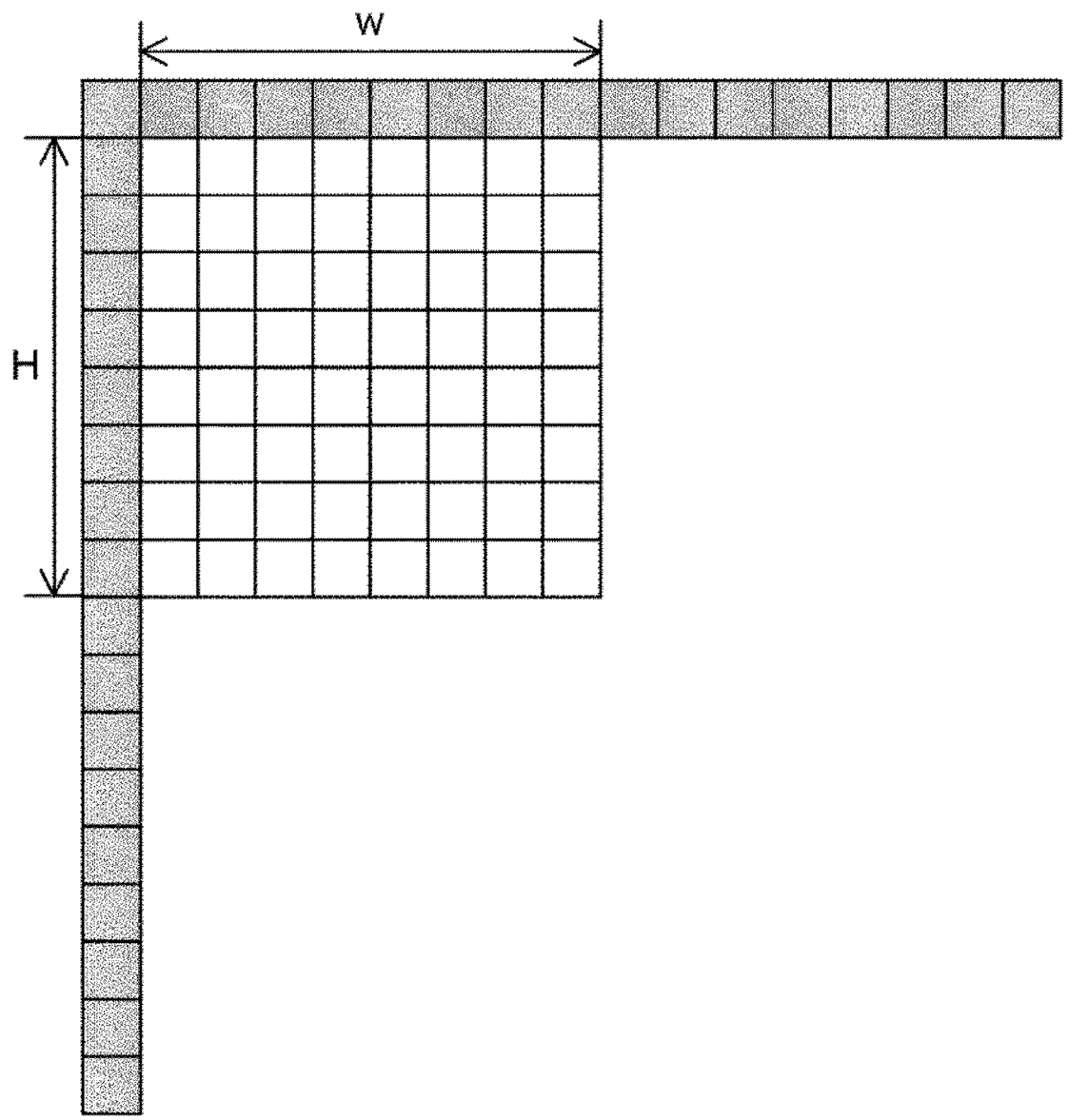
FIGS. 5 and 6 illustrate an intra-prediction method in more detail according to an embodiment of the present disclosure.
Figure 6:
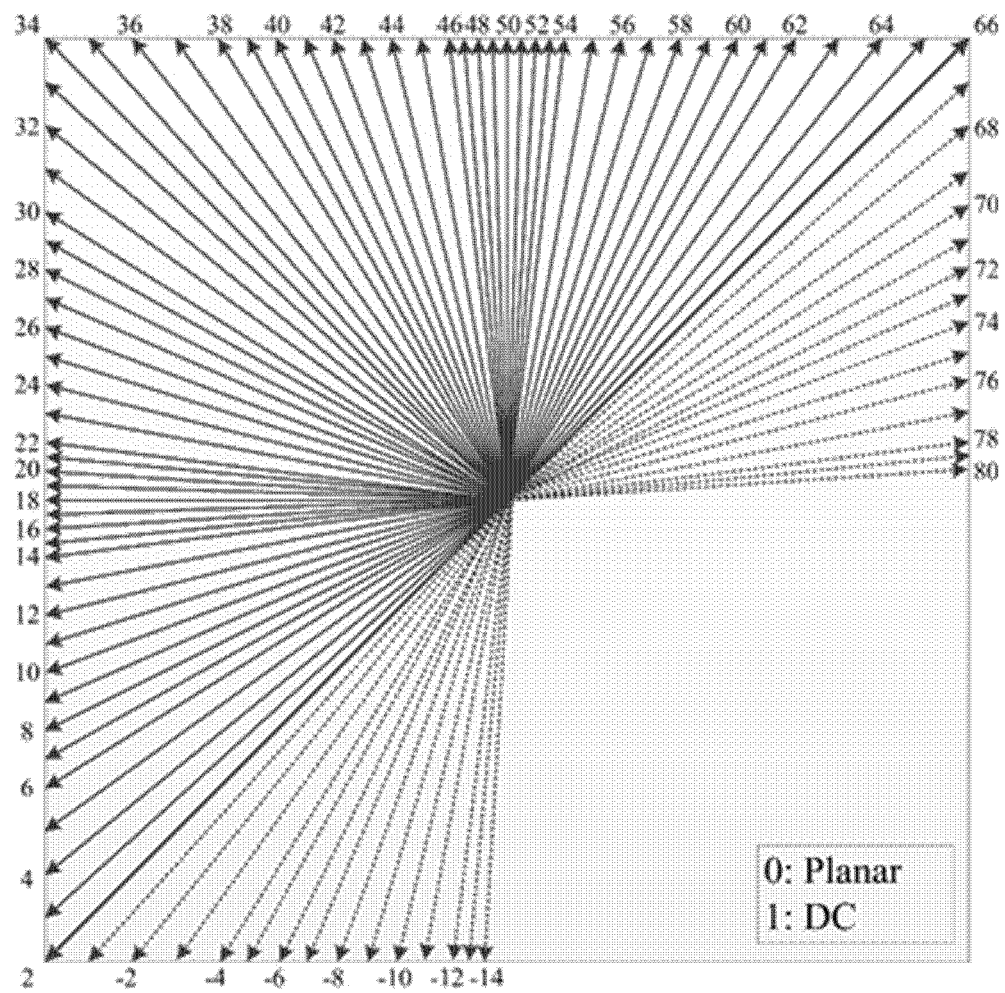

FIGS. 5 and 6 more specifically illustrate an intra prediction method according to an embodiment of the present invention. As described above, the intra prediction unit predicts the sample values of the current block by using the reconstructed samples located on the left and/or upper side of the current block as reference samples.

First, FIG. 5 shows an embodiment of reference samples used for prediction of a current block in an intra prediction mode. According to an embodiment, the reference samples may be samples adjacent to the left boundary of the current block and/or samples adjacent to the upper boundary. As shown in FIG. 5, when the size of the current block is W×H and samples of a single reference line adjacent to the current block are used for intra prediction, reference samples may be configured using a maximum of 2 W+2H+1 neighboring samples located on the left and/or upper side of the current block.

When at least some samples to be used as reference samples have not yet been restored, the intra prediction unit may obtain reference samples by performing a reference sample padding procedure. The intra prediction unit may perform a reference sample filtering procedure to reduce an error in intra prediction. That is, filtering may be performed on neighboring samples and/or reference samples obtained by the reference sample padding procedure, so as to obtain the filtered reference samples. The intra prediction unit predicts samples of the current block by using the reference samples obtained as in the above. The intra prediction unit predicts samples of the current block by using unfiltered reference samples or filtered reference samples. In the present disclosure, neighboring samples may include samples on at least one reference line. For example, the neighboring samples may include adjacent samples on a line adjacent to the boundary of the current block.

Next, FIG. 6 shows an embodiment of prediction modes used for intra prediction. For intra prediction, intra prediction mode information indicating an intra prediction direction may be signaled. The intra prediction mode information indicates one of a plurality of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present invention, the intra prediction mode set may include all intra prediction modes used in intra prediction (e.g., a total of 67 intra prediction modes). More specifically, the intra prediction mode set may include a planar mode, a DC mode, and a plurality (e.g., 65) of angle modes (i.e., directional modes). Each intra prediction mode may be indicated through a preset index (i.e., intra prediction mode index). For example, as shown in FIG. 6, the intra prediction mode index 0 indicates a planar mode, and the intra prediction mode index 1 indicates a DC mode. Also, the intra prediction mode indexes 2 to 66 may indicate different angle modes, respectively. The angle modes respectively indicate angles which are different from each other within a preset angle range. For example, the angle mode may indicate an angle within an angle range (i.e., a first angular range) between 45 degrees and −135 degrees clockwise. The angle mode may be defined based on the 12 o'clock direction. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

Hereinafter, an inter prediction method according to an embodiment of the present disclosure is described with reference to FIG. 7. In the present disclosure, the inter prediction method may include a general inter prediction method optimized for translation motion and an inter prediction method based on an affine model. Further, the motion vector may include at least one of a general motion vector for motion compensation according to the general inter prediction method and a control point motion vector for affine compensation.

Figure 7:
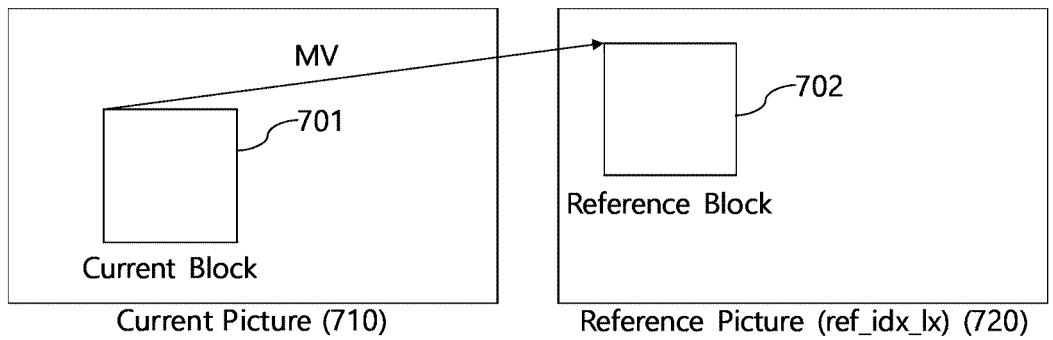
FIG. 7 illustrates an inter prediction method according to an embodiment of the present disclosure.

FIG. 7 illustrates an inter prediction method according to an embodiment of the present disclosure. As described above, the decoder may predict the current block with reference to reconstructed samples of another decoded picture. Referring to FIG. 7, the decoder acquires a reference block 702 within a reference picture 720 on the basis of a motion information set of a current block 701. In this case, the motion information set may include a reference picture index and a motion vector (MV). The reference picture index indicates a reference picture 720 including a reference block for inter prediction of the current block in a reference picture list. According to an embodiment, the reference picture list may include at least one of the L0 picture list or the L1 picture list. The motion vector indicates an offset between a coordinate value of the current block 701 within the current picture 710 and a coordinate value of the reference block 702 within the reference picture 720. The decoder acquires a predictor of the current block 701 on the basis of sample values of the reference block 702 and reconstructs the current block 701 using the predictor.

Specifically, the encoder may acquire the reference block by searching for blocks similar to the current block in pictures having a higher restoration sequence. For example, the encoder may search for a reference block having a minimum sum of differences in sample values from the current block within a preset search area. In this case, in order to measure similarity between the current block and samples of the reference block, at least one of Sum of Absolute Difference (SAD) and Sum of Hadamard Transformed Difference (SATD) may be used. Here, the SAD may be a value obtained by adding all of absolute values of differences in sample values included in two blocks. Further, the SATD may be a value obtained by adding all of absolute values of Hadamard transform coefficients acquired through Hadamard transform of differences in sample values included in two blocks.

Meanwhile, the current block may be predicted using one or more reference areas. As described above, the current block may be inter-predicted through a pair prediction method using two or more reference areas. According to an embodiment, the decoder may acquire two reference blocks on the basis of two motion information sets of the current block. Further, the decoder may acquire a first predictor and a second predictor of the current block on the basis of sample values of the two acquired reference blocks. In addition, the decoder may reconstruct the current block using the first predictor and the second predictor. For example, the decoder may reconstruct the current block on the basis of an average for each of the samples of the first predictor and the second predictor.

As described above, for motion compensation of the current block, one or more motion information sets may be signaled. In this case, similarity between motion information sets for motion compensation of each of a plurality of blocks may be used. For example, the motion information set used for predicting the current block may be induced from motion information sets used for predicting one of other reconstructed samples. To this end, the encoder and the decoder may reduce signaling overhead.

For example, there may be a plurality of candidate blocks that are likely to have been predicted on the basis of a motion information set which is the same as or similar to the motion information set of the current block. The decoder may generate a merge candidate list on the basis of the plurality of candidate blocks. Here, the merge candidate list may include candidates corresponding to samples that are likely to have been predicted on the basis of a motion information set related to the motion information set of the current block, among samples reconstructed earlier than the current block. The encoder and the decoder may configure the merge candidate list of the current block according to a predefined rule. Here, the merge candidate lists respectively configured by the encoder and the decoder may be the same. For example, the encoder and the decoder may configure the merge candidate list of the current block on the basis of a location of the current block in a current picture. A method for configuring a merge candidate list of a current block by the encoder and the decoder will be described with reference to FIG. 9. In the present disclosure, the position of a particular block indicates a relative position of a top-left sample of the particular block in a picture including the particular block.

Meanwhile, in order to improve coding efficiency, a method of quantizing a transform coefficient value obtained by transforming a residual signal and the quantized transform coefficient may be used instead of coding the above-described residual as it is. As described above, the transform unit may obtain a transform coefficient value by transforming a residual signal. In this case, the residual signal of a specific block may be distributed over an entire area of the current block. Accordingly, it is possible to improve coding efficiency by concentrating energy in the low frequency region through frequency domain conversion of a residual signal. Hereinafter, a method of transforming or inversely transforming a residual signal will be described in detail.

Figure 8:
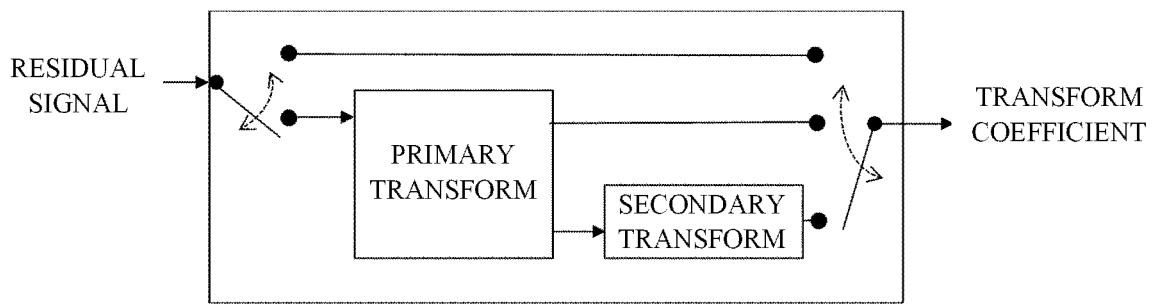
FIG. 8 is a diagram specifically illustrating a method for transforming a residual signal by an encoder.

FIG. 8 is a diagram specifically illustrating a method for transforming a residual signal by an encoder. As described above, a residual signal in a spatial domain may be transformed to a frequency domain. An encoder may obtain a transform coefficient by transforming the obtained residual signal. First, the encoder may obtain at least one residual block including a residual signal for a current block. The residual block may be either the current block or one of blocks divided from the current block. In the present disclosure, the residual block may be referred to as a residual array or a residual matrix which include residual samples of the current block. In the present disclosure, the residual block may represent a transform unit or a block having the same size as that of the transform block.

Next, the encoder may transform the residual block by using a transform kernel. The transform kernel used for transformation of the residual block may be a transform kernel having separable characteristics of vertical transform and horizontal transform. In this case, the transform for the residual block may be performed separately into vertical transform and horizontal transform. For example, the encoder may perform vertical transformation by applying a transform kernel in the vertical direction of the residual block. The encoder may perform horizontal transform by applying the transform kernel in the horizontal direction of the residual block. In the present disclosure, the transform kernel may be used as a term to refer to a parameter set used for transform of the residual signal, such as transform matrix, transform array, transform function, and transform. According to an embodiment, the transform kernel may be any one of a plurality of available kernels. A transform kernel based on different transform types may be used for each of the vertical transform and the horizontal transform. A method for selecting one of multiple available transform kernels will be described with reference to FIG. 12A to FIG. 20.

The encoder may transfer the transform block transformed from the residual block to a quantization unit and quantize the transform block. The transform block may include a plurality of transform coefficients. Specifically, the transform block may include the plurality of transform coefficients arranged in two dimensions. As in the case of the residual block, the size of the transform block may be the same as the size of either the current block or the block divided from the current block. The transform coefficients transferred to the quantization unit may be expressed as quantized values.

The encoder may perform additional transform before the transform coefficients are quantized. As illustrated in FIG. 8, the above-described transform method may be referred to as a primary transform, and an additional transform may be referred to as a secondary transform. The secondary transform may be selective for each residual block. According to an embodiment, the encoder may improve coding efficiency by performing secondary transform for a region where it is difficult to concentrate energy in a low-frequency region only by primary transform. For example, secondary transform may be added to a block in which residual values appear larger in a direction other than the horizontal or vertical direction of the residual block. The residual values of an intra-predicted block may have a higher probability of transformation in a direction other than the horizontal or vertical direction compared to the residual values of an inter-predicted block. Accordingly, the encoder may additionally perform secondary transform on the residual signal of the intra-predicted block. The encoder may omit secondary transform for the residual signal of the inter-predicted block.

As another example, whether to perform a secondary transform may be determined according to the size of a current block or a residual block. In addition, transform kernels with different sizes may be used according to the size of a current block or a residual block. For example, an 8×8 secondary transform may be applied to a block in which the length of a shorter side among the width or the height is equal to or larger than a first pre-configured length. In addition, a 4×4 secondary transform may be applied to a block in which the length of a shorter side among the width or the height is equal to or larger than a second pre-configured length and is smaller than the first pre-configured length. The first pre-configured length may be larger than the second pre-configured length, but the present disclosure is not limited thereto. In addition, a secondary transform may not be divided into a vertical transform and a horizontal transform unlike a primary transform. Such a secondary transform may be called a low frequency non-separable transform (LFNST).

In the case of a video signal in a specific region, energy in a high frequency band may not be reduced even if frequency transformation is performed due to a sudden change in brightness. Accordingly, compression performance due to quantization may be deteriorated. When transform is performed on a region in which a residual value rarely exists, an encoding time and a decoding time may be unnecessarily increased. Accordingly, transform on the residual signal of the specific region may be omitted. Whether to perform transform on the residual signal of the specific region may be determined by a syntax element related to transform of the specific region. For example, the syntax element may include transform skip information. The transform skip information may be a transform skip flag. If the transform skip information on the residual block indicates a transform skip, transform on the residual block is not performed. In this case, the encoder may immediately quantize the residual signal on which transform of a corresponding region has not been performed. The operations of the encoder described with reference to FIG. 8 may be performed via the transform unit of FIG. 1.

The above-described transform-related syntax elements may be information parsed from a video signal bitstream. The decoder may entropy-decode the video signal bitstream so as to obtain transform-related syntax elements. The encoder may entropy-code the transform-related syntax elements so as to generate a video signal bitstream.

Figure 9:
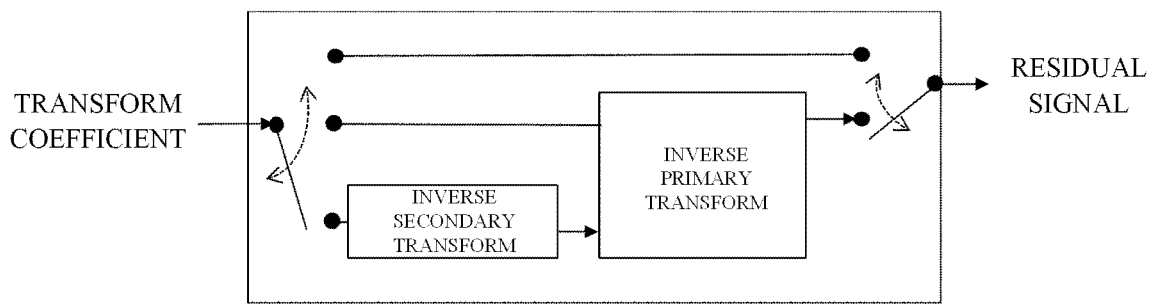
FIG. 9 is a diagram specifically illustrating a method for obtaining a residual signal by inverse transforming a transform coefficient by an encoder and a decoder.

FIG. 9 is a diagram specifically illustrating a method for obtaining a residual signal by inverse transforming a transformation coefficient by an encoder and a decoder. For the convenience of description, it will be described that an inverse transform operation is performed via an inverse transform unit of each of an encoder and a decoder. The inverse transform unit may obtain a residual signal by inverse transforming an inverse quantized transform coefficient. First, the inverse transform unit may detect whether inverse transform for a specific region is performed, from a transform-related syntax element of the region. According to an embodiment, when a transform-related syntax element for a specific transform block indicates a transform skip, transform on the transform block may be omitted. In this case, both the primary inverse transform and the secondary inverse transform described above regarding the transform block may be omitted. The inverse quantized transform coefficient may be used as a residual signal. For example, the decoder may reconstruct a current block by using the inverse quantized transform coefficient as a residual signal.

According to another embodiment, the transform-related syntax element for the specific transform block may not indicate a transform skip. In this case, the inverse transform unit may determine whether to perform secondary inverse transform for secondary transform. For example, when the transform block is a transform block of an intra-predicted block, secondary inverse transform may be performed on the transform block. A secondary transform kernel used for the transform block may be determined based on an intra prediction mode corresponding to the transform block. As another example, whether to perform secondary inverse transform may be determined based on the size of the transform block. Secondary inverse transform may be performed after inverse quantization and before primary inverse transform.

The inverse transform unit may perform primary inverse transform on the inverse quantized transform coefficient or a secondary inverse transformed transform coefficient. In the case of primary inverse transform, vertical transform and horizontal transform may be performed separately as in the case of primary transform. For example, the inverse transform unit may obtain a residual block by performing vertical inverse transform and horizontal inverse transform on the transform block. The inverse transform unit may inverse transform the transform block on the basis of the transform kernel used for transforming the transform block. For example, the encoder may explicitly or implicitly signal information indicating the transform kernel applied to the current transform block from among a plurality of available transform kernels. The decoder may select a transform kernel to be used for inverse transform of the transform block from among the plurality of available transform kernels by using information indicating the signaled transform kernel. The inverse transform unit may reconstruct the current block by using the residual signal obtained via inverse transform on the transform coefficient.

Figure 10:
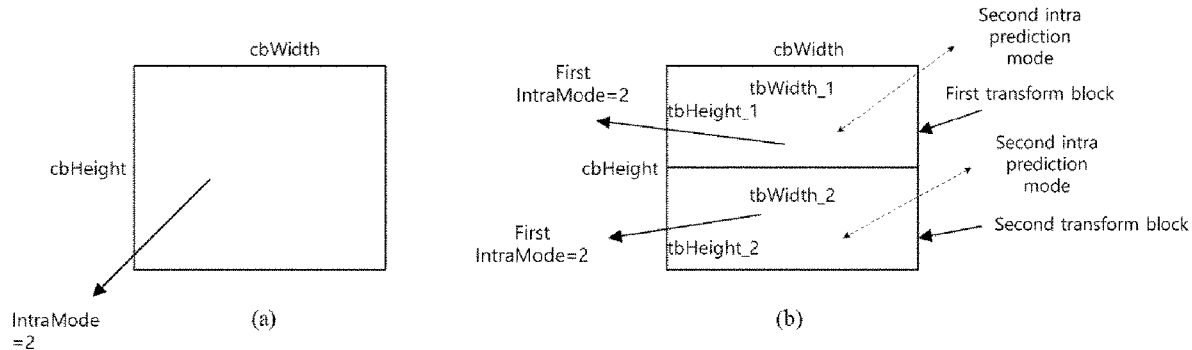
FIG. 10 is a diagram illustrating a method for applying an intra prediction mode in a case where a coding block is divided into multiple transform blocks according to an embodiment of the present disclosure.

FIG. 10 is a diagram illustrating a method for applying an intra prediction mode in a case where a coding block is divided into multiple transform blocks according to an embodiment of the present disclosure. According to an embodiment of the present disclosure, an intra prediction mode may be determined in a unit of coding unit (or coding block) (hereinafter, these may be called block in short). Furthermore, a coding unit may be divided into multiple transform blocks. In an embodiment, an intra prediction mode may be modified (or analyzed, determined, improved) based on the shape of a coding block.

In an embodiment, a method for reanalyzing an intra prediction mode in a case where a block is not a square block is provided. Referring to FIG. 10, nTbW may be a variable indicating a width of a transform block, and nTbH may be a variable indicating a height of a transform block. nTbW may be a variable indicating a width of a coding block, and nTbH may be a variable indicating a height of a coding block. In relation to a block to which intra sub-partition (ISP) has been applied, nTbW may be a variable indicating the width of a coding block, and nTbH may be a variable indicating the height of a coding block. In addition, in the present disclosure, whRatio is a variable indicating a ratio between a width and a height. For example, whRatio may be configured (or defined) as Abs(Log 2(nTbW/nTbH)). Hereinafter, an intra prediction mode signaled from the encoder to the decoder may be called a first prediction mode (or a first intra prediction mode), and a modified (or reanalyzed, determined, improved) mode may be called a second prediction mode (or a second intra prediction mode). Hereinafter, abs( ) indicates an operator (or a function) of applying an absolute value. A modified intra prediction mode may be derived based on the following conditions.

First condition: nTbW>nTbH
  Second condition: a first prediction mode is equal to or larger than 2
  Third condition: the first prediction mode is smaller than (8+2*whRatio) if whRatio>1, and the first prediction mode is smaller than 8 if whRatio<1

If the three conditions including the first to third conditions are satisfied, the decoder may configure 1 as wideAngle, and may configure (first prediction mode+65) as a second prediction mode. wideAngle is a variable indicating whether a wide angle mode is used.

Fourth condition: nTbW>nTbH
  Fifth condition: the first prediction mode is equal to or smaller than 66
  Sixth condition: the first prediction mode is larger than (60−2*whRatio) if whRatio>1, and the first prediction mode is larger than 60 if whRatio<1

If all the fourth to sixth conditions are satisfied, the decoder may configure 1 as wideAngle, and may configure (first prediction mode—67) as the second prediction mode.

According to an embodiment of the present disclosure, intra prediction modes may be divided into basic angle modes and extended angle modes. The basic angle modes may be angle modes in a range of +−45 degrees with respect to a vertical mode/horizontal mode, and the extended angle modes may be angle modes beyond +−45 degrees with respect to the vertical mode/horizontal mode. Therefore, signaled mode information may indicate use of a basic angle mode or an extended angle mode according to the shape of a coding block. The number of available extended angle modes may be defined according to a ratio between a transverse length and a longitudinal length (or a ratio between a longitudinal length and a transverse length) based on the shape of a coding block. For example, the ratio may be defined (configured) by 2:1, 4:1, 8:1, 16:1, etc.

For example, as illustrated in FIG. 10(a), a cbWidth× cbHeight coding block determined to use intra prediction mode 2 may be divided into two horizontal transform blocks as illustrated in FIG. 10(b). If tbWidth_1 is larger than tbHeight_1, a first transform block having a tbWidth_1× tbHeight_1 size may have a horizontal rectangular block shape. cbWidth is a variable indicating the width of a coding block, and cbHeight is a variable indicating the height of a coding block. tbWidth is a variable indicating the width of a transform block, and tbHeight is a variable indicating the height of a transform block.

The signaled intra prediction mode 2 may be reanalyzed based on the shape of the first transform block and then modified into an extended angle mode, which is (2+65) according to the described analysis method. Therefore, a second prediction mode may be derived (determined) to 67. That is, an intra prediction mode determined in a unit of coding blocks may not be used for a unit of transform blocks in the same way. In this case, a performance change may be caused.

Therefore, an embodiment of the present disclosure proposes a method of applying, as follows, a method for determining a wide angle mode to apply the same intra prediction mode as determined for a coding block to a transform block. As an embodiment, the encoder/decoder may configure nTbW and nTbH as cbWidth and cbHeight of a coding block to derive a second prediction mode. The encoder/decoder may determine (or decide) whether to use a wide angle mode, by using the height and the width of a coding block including a transform block. In FIG. 10, a case of division of a transform block having a horizontal rectangular shape is illustrated as an example, but the present disclosure is not limited thereto. That is, the proposed embodiment may be applied in the same way even to a case of separating vertical rectangles, squares, or various combined shapes.

Figure 11:
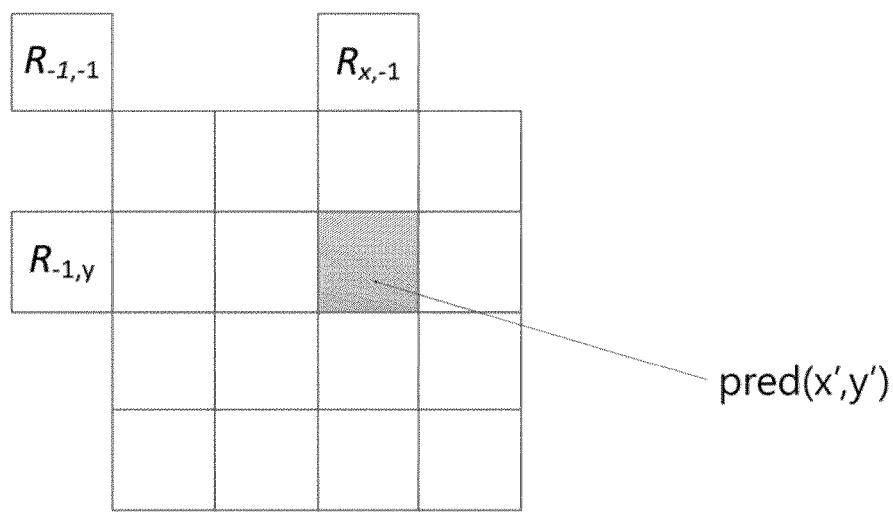
FIG. 11 is a diagram illustrating a method for applying a position-dependent intra prediction combination (PDPC) according to an embodiment of the present disclosure.

FIG. 11 is a diagram illustrating a method for applying a position-dependent intra prediction combination (PDPC) according to an embodiment of the present disclosure. A PDPC may be applied to an intra block if the following conditions are all satisfied.

Condition 1. IntraSubPartitionsSplitType(ISP partition type) is ISP_NO_SPLIT, or cIdx(component index) is not the same as 0.

Condition 2. refIdx(reference sample line index) is the same as 0, or cIdx is not the same as 0.

Condition 3. If at least one of the following conditions is satisfied:
  predModeIntra(intra prediction mode) is INTRA_PLANAR
  predModeIntra(intra prediction mode) is INTRA_DC
  predModeIntra(intra prediction mode) is INTRA_ANGULAR18
  predModeIntra(intra prediction mode) is INTRA_ANGULAR50
  predModeIntra(intra prediction mode) is equal to or smaller than INTRA_ANGULAR10
  predModeIntra(intra prediction mode) is equal to or larger than INTRA_ANGULAR58

According to an embodiment of the present disclosure, a PDPC operation may be applied according to a method described below. A PDPC described in the present disclosure is not limited to its name, and such a PDPC may be called position-dependent intra prediction sample filtering.

As an embodiment, pred(x, y), which is a prediction sample positioned at (x, y), may be predicted by using a linear combination of reference samples according to a PDPC and an intra prediction mode (e.g., DC, planar, or directional mode) as in Equation 1 below.

$$\text{pred}(x,y)=(wL \times R_{-1,y}+wT \times R_{x,-1}-wTL \times R_{-1,-1}+(64-wL-wT+wTL) \times \text{pred}(x,y)+32)>>6 \quad \text{[Equation 1]}$$

In the equation, $R_{x,-1}$ and $R_{-1,y}$ indicate reference samples positioned on the left of and above a current sample (x, y), respectively, and $R_{-1,-1}$ indicates a reference sample positioned at the top-left of a current block. If the DC mode is applied to the current block, a weight (this may be called a PDPC weight) may be calculated based on Equation 2 below.

$$wT=32>>((y<<1)>>\text{shift}), wL=32>>((x<<1)>>\text{shift}), wTL=(wL>>4)+(wT>>4) \quad \text{[Equation 2]}$$

In equation 2, shift may be configured as (log 2(width)−2+log 2(height)−2+2)>>2. With respect to the planer mode, wTL may be configured to be 0 (wTL=0), with respect to the horizontal mode, wTL may be configured to be wT (wTL=wT), and with respect to the vertical mode, wTL may be configured to be wL (wTL=wL). A PDPC weight may be calculated only based on a summation and a shift operation. A value of pred(x, y) may be calculated through a single stage by using Equation 1 described above.

If a PDPC is applied to the DC, planar, horizontal, and/or vertical mode, additional boundary filtering may not be required. As an example, the additional boundary filtering may include a conventional image compression technique (e.g., HEVC)-based DC mode boundary filter or horizontal/vertical mode edge filter.

Figure 12:
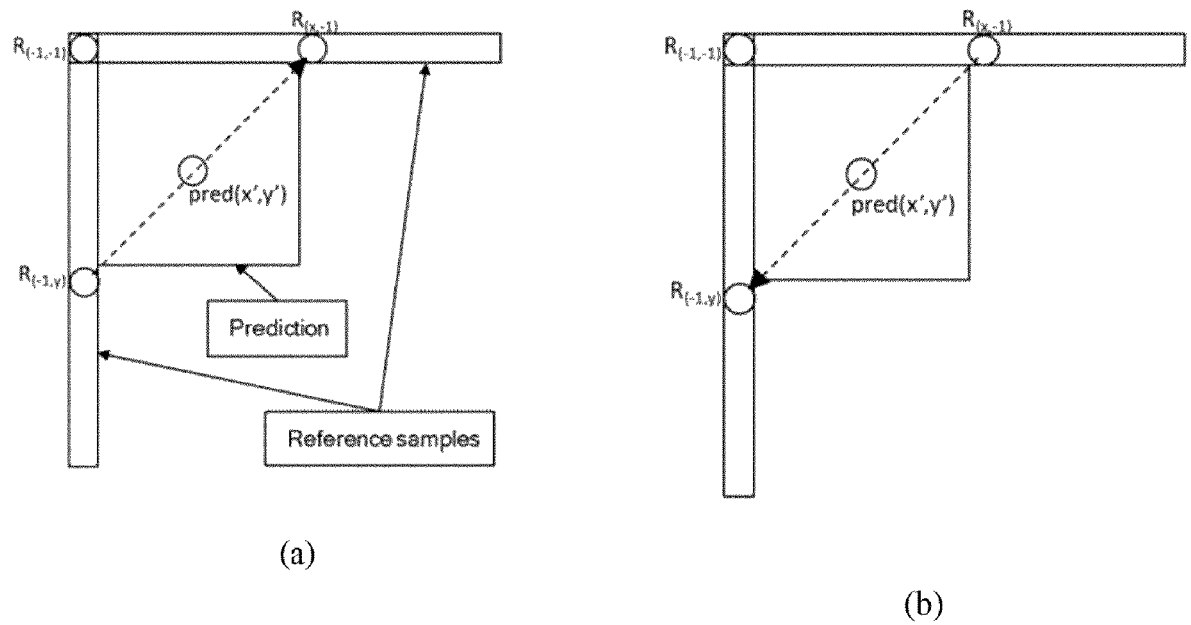
FIG. 12 is a diagram illustrating an example of reference samples used for a PDPC according to an intra prediction mode, as an embodiment of the present disclosure.

FIG. 12 is a diagram illustrating an example of reference samples used for a PDPC according to an intra prediction mode, as an embodiment of the present disclosure. Referring to FIG. 12, in FIG. 12(a), an intra prediction mode is assumed to be prediction mode 2, and in FIG. 12(b), an intra prediction mode is assumed to be prediction mode 66. Specifically, FIG. 12 illustrates reference samples $R_{x,-1}$, $R_{-1,y}$ and $R_{-1,-1}$ of a case where a PDPC is applied to a top-right diagonal mode. Prediction sample pred(x', y') indicates a prediction sample positioned at (x', y') in a prediction block. Coordinate x of reference sample $R_{x,-1}$ is given as x=x'+y'+1. Similarly, coordinate y of reference sample $R_{-1,y}$ is given as y=x'+y'+1.

According to an embodiment of the present disclosure, a PDPC weight for a top-right diagonal mode may be determined according to Equation 3 below.

$$wT=16>>((y'<<1)>>\text{shift}), wL=16>>((x'<<1)>>\text{shift}), wTL=0 \quad \text{[Equation 3]}$$

Figure 13:
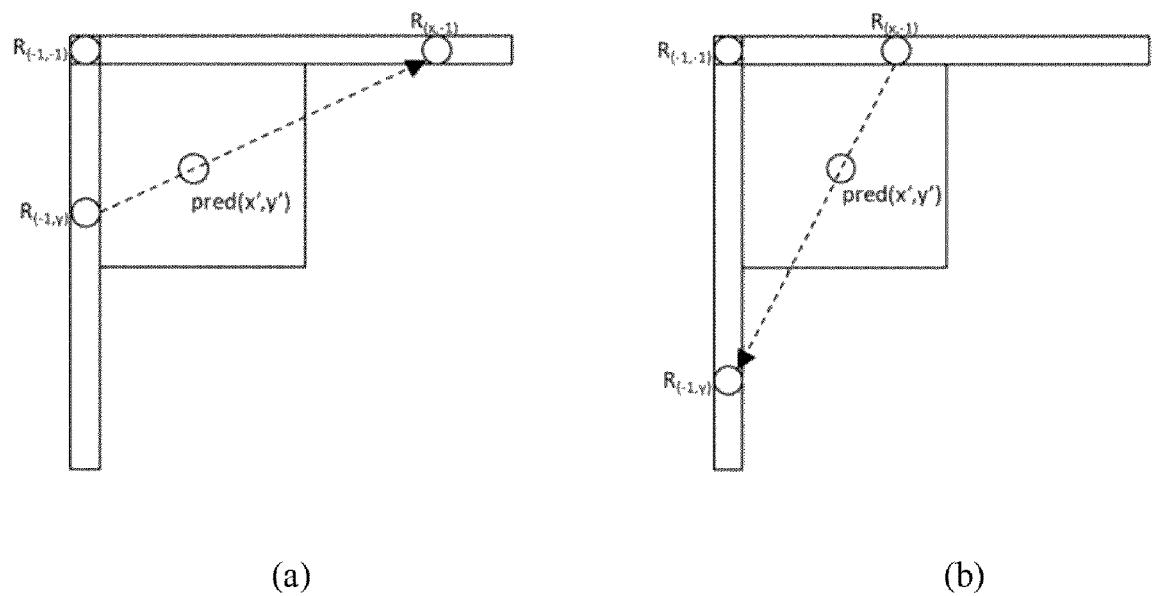
FIG. 13 is a diagram illustrating an example of reference samples used for a PDPC according to an intra prediction mode, as an embodiment of the present disclosure.

FIG. 13 is a diagram illustrating an example of reference samples used for a PDPC according to an intra prediction mode, as an embodiment of the present disclosure. Referring to FIG. 13, in FIG. 13(a), a mode number (or a mode index) of an intra prediction mode is assumed to be one among 3 to 10, and in FIG. 13(b), the mode number of an intra prediction mode is assumed to be one among 58 to 65. Similarly to FIG. 12 described above, FIG. 13 illustrates reference samples $R_{x,-1}$, $R_{-1,y}$ and $R_{-1,-1}$ of a case where a PDPC is applied to a bottom-left diagonal mode. Prediction sample pred(x', y') indicates a prediction sample positioned at (x', y') in a prediction block. Coordinate x of reference sample $R_{x,-1}$ is given as x=x'+y'+1. Furthermore, similarly, coordinate y of reference sample $R_{-1,y}$ is given as y=x'+y'+1.

According to an embodiment of the present disclosure, a PDPC weight for a bottom-left diagonal mode may be determined according to Equation 4 below.

$$wT=16>>((y'<<1)>>\text{shift}), wL=16>>((x'<<1)>>\text{shift}), wTL=0. \quad \text{[Equation 4]}$$

In a case of FIG. 13(a), related to a top-right diagonal mode, a PDPC weight may be defined as in Equation 5 below.

$$wT=32>>((y'<<1)>>\text{shift}), wL=0, wTL=0 \quad \text{[Equation 5]}$$

In the same way, in a case of FIG. 13(b), related to a bottom-left diagonal mode, a PDPC weight may be defined as in Equation 6 below.

$$wL=32>>((x'<<1)>>\text{shift}), wT=0, wTL=0 \quad \text{[Equation 6]}$$

Referring to FIG. 12 and FIG. 13, as an embodiment, additional boundary filtering may not be required for a diagonal mode and an adjacent mode of a diagonal mode, as illustrated in FIG. 13, as in the case where a PDPC is applied to the DC, planar, horizontal, and/or vertical mode.

The coordinates of the reference samples of the examples illustrated in FIG. 13 may be derived based on a table defined for directional mode intra prediction. As described above, the table may be defined by diagonal modes and adjacent modes thereof. Therefore, there is an advantage in that an additional table according to PDPC implementation described in the present disclosure is not required. Furthermore, when coordinates x and y are calculated, a multiplication operation may not be used. In addition, in an embodiment, in a case where the coordinates of a reference sample are fractions, linear interpolation may be performed on the reference sample.

Figure 14:
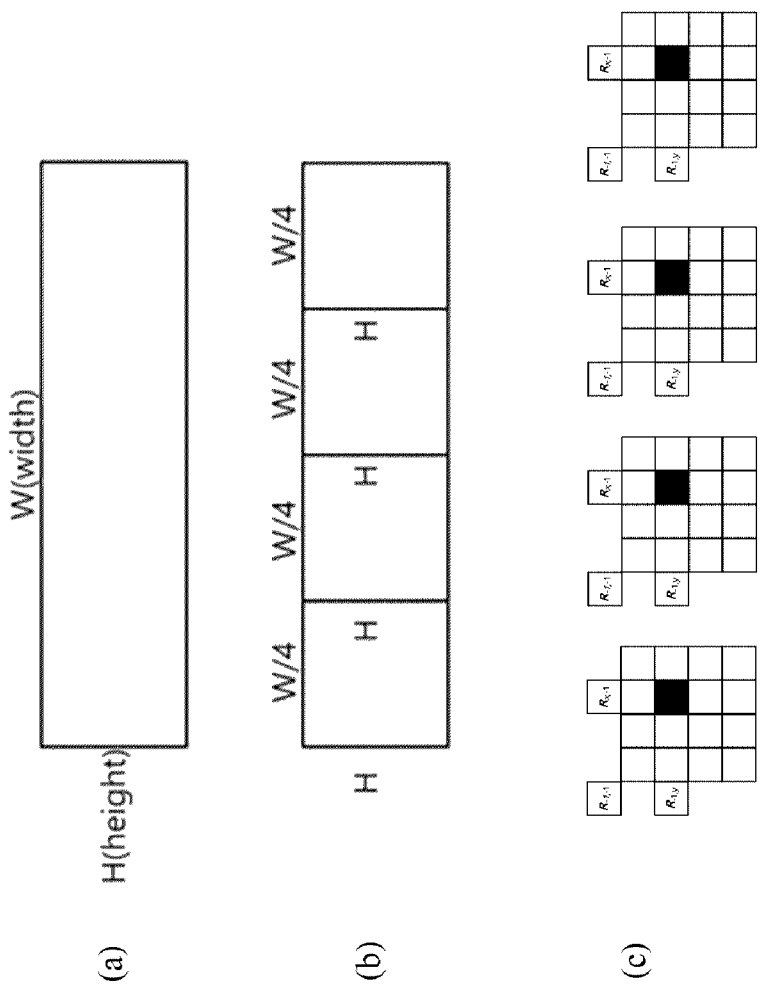
FIG. 14 is a diagram illustrating an example of a method for applying intra sub-partition (ISP) and a position-dependent intra prediction combination (PDPC) to a coding block according to an embodiment to which the present disclosure is applied.

FIG. 14 is a diagram illustrating an example of a method for applying intra sub-partition (ISP) and a position-dependent intra prediction combination (PDPC) to a coding block according to an embodiment to which the present disclosure is applied. Referring to FIG. 14(a), a current coding block may be expressed by W×H using a width (W) and a height (H). FIG. 14(b) illustrates an example in which, in a case where an ISP mode is applied, the current coding block is vertically divided into four transform blocks. FIG. 14(c) illustrates an example in which a PDPC is applied in a unit of the divided transform blocks illustrated in FIG. 14(b).

In an embodiment, the encoder/decoder may use (or apply) an interpolation filter in a unit of the transform blocks for which ISP has been applied as illustrated in FIG. 14(b). The interpolation filter indicates a method of acquiring a sample value from a reference sample. As an embodiment, the encoder/decoder may use a cubic interpolation filter coefficient if a filter flag is 0, and may use a Gaussian interpolation filter coefficient if the filter flag is 1. The encoder/decoder may determine a reference sample value by using a determined interpolation filter coefficient, and may use the value as a prediction value. In addition, in an embodiment, the encoder/decoder may configure 1 as a filter flag of a block, a transform block of which is a luma component, and to which ISP has been applied. As another example, the encoder/decoder may determine whether to apply an interpolation filter, based on a filter flag.

In addition, in an embodiment, the encoder/decoder may configure (or determine) a filter flag value, based on the width (W) and the height (H) of a block with respect to a transform block which is a luma component and for which ISP has been applied. As an embodiment, the encoder/decoder may configure a flag value by comparing the number (W*H) of samples of a block with a predefined (or pre-configured) particular reference value. For example, the encoder/decoder may perform a comparison such as W*H>a reference value, W*H>=the reference value, W*H<the reference value, and W*H<=the reference value. As another method, the encoder/decoder may differently configure a filter flag value by comparing each of the width and the height of a block with a reference value. As an embodiment, a condition to determine a filter flag value may be defined by (W>a reference value and H>a reference value) or (W>a reference value or H>a reference value). In the above example, the sign of inequality is not limited to "larger than the reference value", and may also be defined by "equal to", "equal to or larger than" "smaller than", or "equal to or smaller than". The reference values applied to W and H may be different from each other, and different signs of inequality may be applied thereto. Alternatively, a filter flag value may be configured according to whether a block size belongs to a particular block size range.

Referring to FIG. 14(c), in an embodiment of the present disclosure, the encoder/decoder may apply a PDPC to a block to which ISP has been applied. For example, the encoder/decoder may determine whether to apply a PDPC to a block to which ISP has been applied, based on the number (W*H) of samples of the block. In an embodiment, a condition to determine whether to apply a PDPC, based on the number of samples of the block may be defined. For example, the condition may be W*H>a reference value, W*H>=the reference value, W*H<the reference value, and W*H<=the reference value. The reference value may be a pre-configured value. As another embodiment, a condition to determine whether to apply a PDPC may be defined by (W>a reference value and H>a reference value) or may be defined by (W>a reference value or H>a reference value). In the above example, the sign of inequality is not limited to "larger than the reference value", and may also be defined by "equal to", "equal to or larger than" "smaller than", or "equal to or smaller than". For example, a condition to determine whether to apply a PDPC may be defined by (W a reference value and H a reference value) or may be defined by (W a reference value or H a reference value). As an embodiment, the reference values applied to W and H may be the same, or different from each other, and may be defined with the same signs (or the same signs of inequality) or different signs.

Furthermore, referring to FIG. 14(c), in an embodiment of the present disclosure, a process in which a block to which ISP has been applied is divided into multiple rectangular transform blocks, and encoding/decoding is performed in a unit of the divided transform blocks may be performed. In an embodiment, the encoder/decoder may apply a PDPC in a unit of coding blocks, rather than a unit of transform blocks. That is, the encoder/decoder may perform a PDPC in a unit of coding blocks, rather than a unit of transform blocks, with respect to a coding block to which ISP has been applied.

Referring to FIG. 14(c), in an embodiment of the present disclosure, when the encoder/decoder applies a PDPC to a block to which ISP has been applied, the encoder/decoder may apply the PDPC to some modes among modes to which the PDPC is applied, only when a particular condition defined for the some modes is satisfied. For example, as in the above embodiment, if application of a PDPC is determined based on the number of samples or a width/height, a reference value may be differently configured for the planar mode, the horizontal mode, and the vertical mode.

In addition, according to an embodiment of the present disclosure, when the encoder/decoder determines whether to apply reference sample filtering, the encoder/decoder may configure a filter flag indicating whether to apply filtering, based on whether a block is a block to which ISP and/or a PDPC has been applied. For example, a filter flag of a block to which ISP and a PDPC have been applied may be configured to have a fixed value of 0 or 1. Alternatively, a filter flag value of a block to which ISP and a PDPC have been applied may be determined by a mode dependent intra smoothing (MDIS) condition. Alternatively, the encoder/decoder may apply different filter flag values to a block to which ISP and a PDPC have been applied and a block to which only ISP has been applied.

In addition, according to an embodiment of the present disclosure, when the encoder/decoder determines a wide angle mode, the encoder/decoder may reconfigure an intra prediction mode, based on the width and the height of a coding block. For example, the encoder/decoder may perform, on a block to which ISP has been applied, a process of reanalyzing a wide angle mode, based on the width and the height of a coding block, and may configure a reference sample filter flag, based on the process. Alternatively, the encoder/decoder may differently configure a wide angle mode application method, based on the partition direction/size of a block to which ISP has been applied. As an embodiment, a particular partition direction may be applied based on the width/height of a transform block, or the width/height of a coding block, and the other directions may be applied according to a different scheme. As another embodiment, the encoder/decoder may apply a wide angle mode, based on the width and the height of each of divided transform blocks. For example, if a minimum value of the width and the height of a transform block is larger than, or is equal to or larger than, a reference value, a wide angle mode may be applied using the height and the width of a coding block, and if the minimum value is smaller than, or is equal to or smaller than, the reference value, a wide angle mode may be applied using the width and the height of the transform block. Alternatively, on the contrary, if a minimum value of the width and the height of a transform block is larger than, or is equal to or larger than, a reference value, a wide angle mode may be applied using the width and the height of the transform block, and if the minimum value is smaller than, or is equal to or smaller than, the reference value, a wide angle mode may be applied using the height and the width of a coding block.

In the above description, one or more of the embodiments described with reference to FIG. 10 to FIG. 14 may be applied in combination or independently. Furthermore, the above embodiment may be applied by the decoder and the encoder in substantially the same manner.

Figure 15:
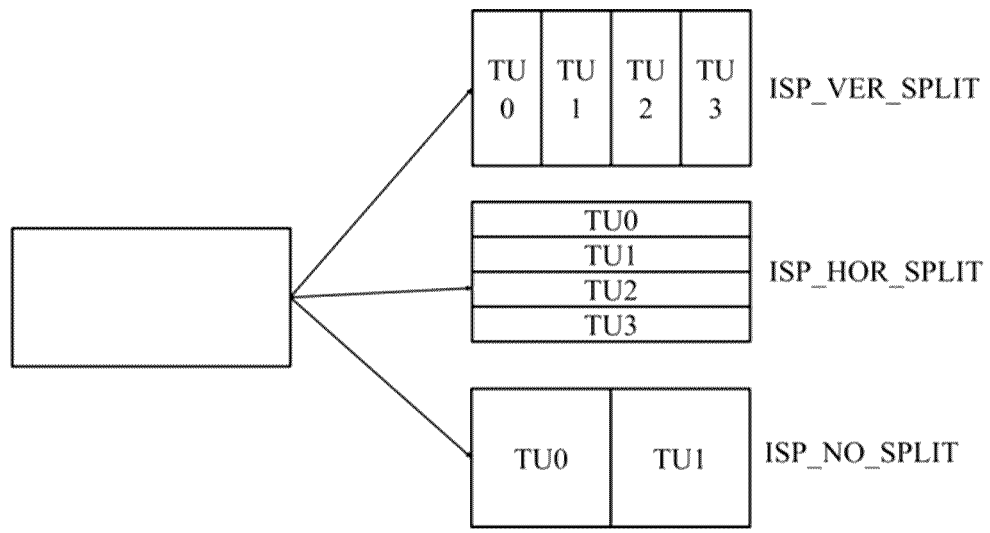
FIG. 15 is a diagram illustrating a transform unit partition processing method according to an embodiment of the present disclosure.

FIG. 15 is a diagram illustrating a transform unit partition processing method according to an embodiment of the present disclosure. Referring to FIG. 15, in an embodiment of the present disclosure, the encoder/decoder may partition a current block (a coding block, or a coding unit) into multiple transform blocks to encode or decode the current block. As an embodiment, if an intra sub-partition (ISP) mode is applied, a coding block may be divided into multiple transform blocks. Alternatively, if the size of a coding block is larger than a maximum transform size, the coding block may be divided into multiple transform blocks. If an intra sub-partition mode is applied, a coding block may be divided into horizontal or vertical rectangular transform blocks, and may be divided into two or four transform blocks, as illustrated in FIG. 15.

Figure 16:
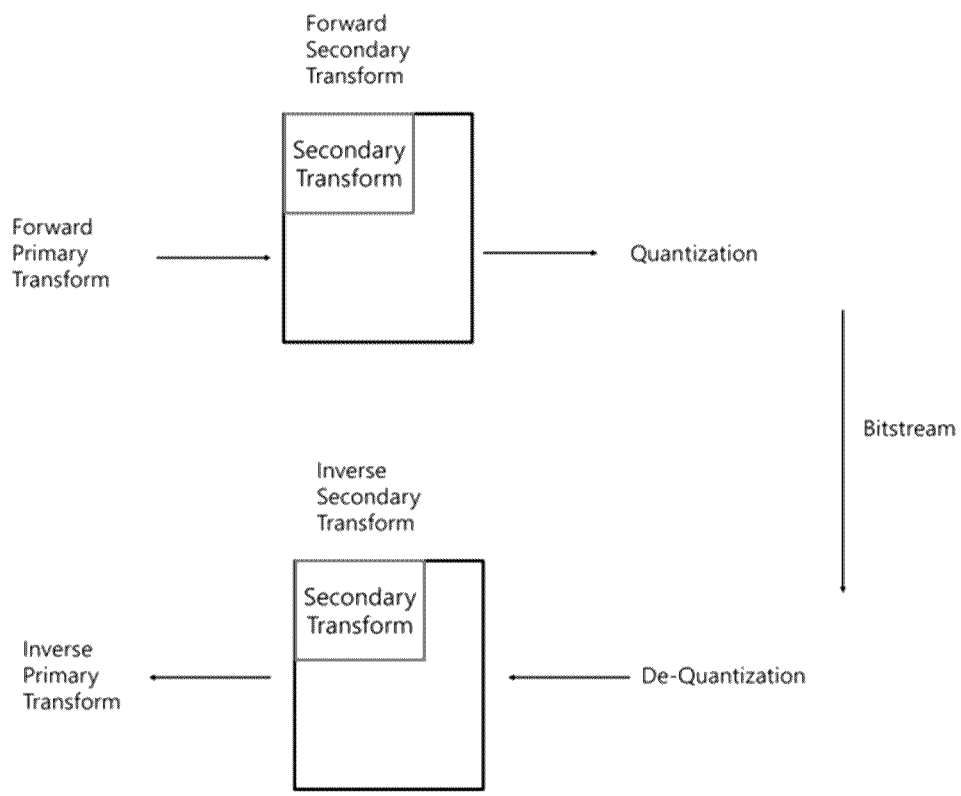
FIG. 16 is a diagram illustrating a process in which encoding/decoding is performed through a primary transform and a secondary transform according to an embodiment to which the present disclosure is applied.

FIG. 16 is a diagram illustrating a process in which encoding/decoding is performed through a primary transform and a secondary transform according to an embodiment to which the present disclosure is applied. As described above, a coding block may be divided into multiple transform blocks, and the encoder/decoder may apply a transform to the divided transform blocks. FIG. 16 shows an example in which a transform is applied to a transform block two times. A forward primary transform illustrated in FIG. 16 indicates a transform which is firstly applied with reference to the encoder side, and may be called a primary transform in the present disclosure. A forward secondary transform illustrated in FIG. 16 indicates a transform which is secondarily applied with reference to the encoder side, and may be called a secondary transform in the present disclosure. A secondary transform (i.e., an inverse secondary transform) and a primary transform (i.e., an inverse primary transform) may be sequentially performed on an inverse-quantized transform block with reference to the decoder side. As described above, a secondary transform may be called a low frequency non-separable transform (LFNST).

In an embodiment of the present disclosure, a transform matrix (or a transform kernel, a transform type) used for a primary transform may be a transform matrix, such as DCT-2, DST-7, and DCT-8, which has been known in a conventional image compression technology. A secondary transform may be applied to a partial area in a transform block according to the size of a coding block. For example, the partial area may be a 4×4 area, or an 8×8 area. The position of the partial area may be a top-left area of the coding block (or transform block). As an embodiment, if both the width and the height of a coding block are larger than 4, the transform may be applied to a top-left 8×8 area, and if one of the width and the height is equal to 4, the transform may be applied to a top-left 4×4 area. A secondary transform may be applied to a luma component and a chroma component of a block which has been coded according to an intra mode.

FIG. 17 is a diagram illustrating a method for selecting a transform kernel used for a secondary transform according to an embodiment of the present disclosure. Referring to FIG. 17, a transform kernel set (or a transform type set, a transform matrix set) may be determined based on a prediction mode used for an intra prediction, and a table illustrated in FIG. 17 may be defined in the encoder/decoder. In the present embodiment, an intra prediction mode may be defined by −14 to 83. As illustrated in FIG. 17, a transform kernel set may be determined for each of intra prediction mode groups. The same index may be applied to a luma component and a chroma component. A secondary transform kernel set is determined based on an intra prediction mode, and a transform kernel set may be determined after an intra prediction mode is obtained (or determined). Therefore, a dependence problem is caused. Therefore, in an embodiment of the present disclosure, a method of removing this dependence is described.

As an embodiment, the encoder/decoder may determine a transform kernel set applied to a current block, according to an intra prediction mode in consideration of the following matters.

a ratio of a transverse length to a longitudinal length of a CU, or a ratio of the longitudinal length to the transverse length
  the size of the CU
  the type of a primary transform
  an MTS index
  whether an implicit MTS is applied The encoder/decoder may determine a transform kernel set based on the above matters, and one of the above matters or a combination of multiple thereof may be used for the determination of the transform kernel set.

FIG. 18 is a diagram illustrating an example of a method for applying a secondary transform in a unit of transform blocks according to an embodiment of the present disclosure. According to an embodiment of the present disclosure, the encoder/decoder may divide a coding block (or a coding unit) into multiple transform blocks (or transform units), and may apply a secondary transform to each of the transform blocks. A secondary transform may be applied to each of multiple transform blocks into which one coding unit are divided. The size of each of the transform blocks is determined based on a method of dividing a coding unit. The size of each of transform blocks of a coding unit to which ISP has been applied may be determined according to vertical division or horizontal division as illustrated in FIG. 15, and the size may be determined according to the number of additionally partitions. The number of partitions of a block to which ISP has been applied may be 2 or 4. FIG. 18 illustrates a case where one coding unit, which is a block to which ISP is applied, is vertically divided, and the number of partitions are four. As in FIG. 14(b) described above, if the size of a coding unit is W×H, the size of each of transform blocks may be W/4×H. The size of the transform blocks may be used as the width and the height determining whether to apply a secondary transform.

According to an embodiment of the present disclosure, the encoder/decoder may use the same transform kernel set for each of transform blocks, or may use different transform kernel sets. The divided transform blocks may use the same transform kernel if the blocks use the same intra prediction mode and the sizes thereof are the same. On the contrary, the encoder/decoder may determine and use a kernel set for each of the transform blocks. A luma component of a coding unit to which an intra sub-partition mode has been applied is transformed into multiple transform blocks, but chroma components thereof may not be divided. In this case, a luma transform block and a chroma transform block may use the same secondary transform kernel set, and the size of a coding block to which a secondary transform block is applied is required to be satisfied. In addition, a luma transform block and a chroma transform block may have different sizes. The encoder/decoder may apply secondary transform to a 4×4 or 8×8 area according to a condition of a block size for which a secondary transform block is applied. As another method, the encoder/decoder may use, for chroma components, the same area as applied to a luma transform. An intra prediction mode for luma and an intra prediction mode for chroma may be different from each other, and thus the encoder/decoder may use different transform kernel sets. The description is given in relation to a method for determining a kernel set, based on an intra prediction mode, but all the methods for determining a secondary transform kernel set, described with reference to FIG. 17, may be applied thereto.

According to an embodiment of the present disclosure, if the size of a coding unit is larger than a maximum transform size, the coding unit may be divided into multiple transform blocks without separate signaling. In this case, if a secondary transform is applied, a performance may degrade and complexity may increase. Therefore, a maximum coding block to which a secondary transform is applied may be limited. The size of a maximum coding block may be the same as the maximum transform size. Alternatively, a pre-configured size of a coding block may be used. The pre-configured value may be 64, 32, or 16, but the present disclosure is not limited thereto. The pre-configured value may be the value of the length of a longer side, or the number of total samples.

In addition, in an embodiment, the encoder/decoder may not limit the size of a secondary transform block to a top-left 4×4 or 8×8 area of a coding unit, and may define 2×8, 8×2, 4×16, 16×4, 2×32, and 32×2 areas. The encoder/decoder may determine an area to which a secondary transform is applied, adaptively/without signaling in consideration of a ratio of a transverse length to a longitudinal length of a coding block, or a ratio of the longitudinal length to the transverse length.

FIG. 19 is a diagram illustrating a method for applying a PDPC to a current coding block to which an intra prediction mode is applied according to an embodiment to which the present disclosure is applied. According to an embodiment of the present disclosure, if a current block is not square, the encoder/decoder may perform a prediction using only a reference sample of a longer side in a case of a DC mode among intra prediction modes. In this case, a sample value of a shorter side may not be reflected for a prediction of a current coding block at all. In this case, a prediction value of the current block and the reference sample of the shorter side may have a large difference. Therefore, the encoder/decoder may perform position-based filtering on a sample at the time of intra prediction. As described above, in the present disclosure, this position-based filtering method for a sample may be called a PDPC. If a PDPC is applied, the encoder/decoder may perform filtering based on a weight by using a first reference sample, a second reference sample, and a reference sample value adjacent to a top-left in a DC mode. Reference samples and/or a weight applied to each of the reference samples may be derived by using Equation 7 to Equation 12 below.

$$refL[x][y]=p[-1][y] \quad \text{[Equation 7]}$$

$$refT[x][y]=p[x][-1] \quad \text{[Equation 8]}$$

$$wT[y]=32>>((y<<1)>>nScale) \quad \text{[Equation 9]}$$

$$wL[x]=32>>((x<<1)>>nScale) \quad \text{[Equation 10]}$$

$$wTL[x][y]=(predModeIntra==INTRA\_DC)?((wL[x]>>4)+(wT[y]>>4)):0 \quad \text{[Equation 11]}$$

$$predSamples[x][y]=clip1Cmp((refL[x][y]*wL[x]+refT[x][y]*wT[y]-p[-1][-1]*wTL[x][y]+(64-wL[x]-wT[y]+wTL[x][y])*predSamples[x][y]+32)>>6) \quad \text{[Equation 12]}$$

In the above equations, a left reference sample may be derived by using Equation 7, and a right reference sample may be derived by using Equation 8. A weight value applied to the right reference sample may be derived by using Equation 9, a weight value applied to the left reference sample may be derived by using Equation 10, and a weight value applied to a reference sample positioned at the top-left edge may be derived by using Equation 11. Afterward, the encoder/decoder may generate a prediction sample according to Equation 12, based on the determined weight values.

According to an embodiment of the present disclosure, the encoder/decoder may configure different weight values for a relatively longer side and a shorter side of a non-square block, which is not a square block. For example, the encoder/decoder may configure a smaller weight value applied to a relatively longer side than that applied to a shorter side. In Equation 9 and Equation 10 above, if a side belongs to a shorter side, a weight value may be configured to be different from that of a longer side. For example, a weight value may be configured to be 16, 8, 4, etc. rather than 32. Alternatively, a scale variable nScale, which is used in Equation 9 and Equation 10 above, may be used. The encoder/decoder may configure the values of a longer side and a shorter side according to the positions thereof.

In an embodiment, if multiple reference line samples are used, the encoder/decoder may apply a PDPC to the vertical mode and/or the horizontal mode. Alternatively, the encoder/decoder may apply a PDPC to the vertical, the horizontal, the DC, and the planar mode.

Figure 20:
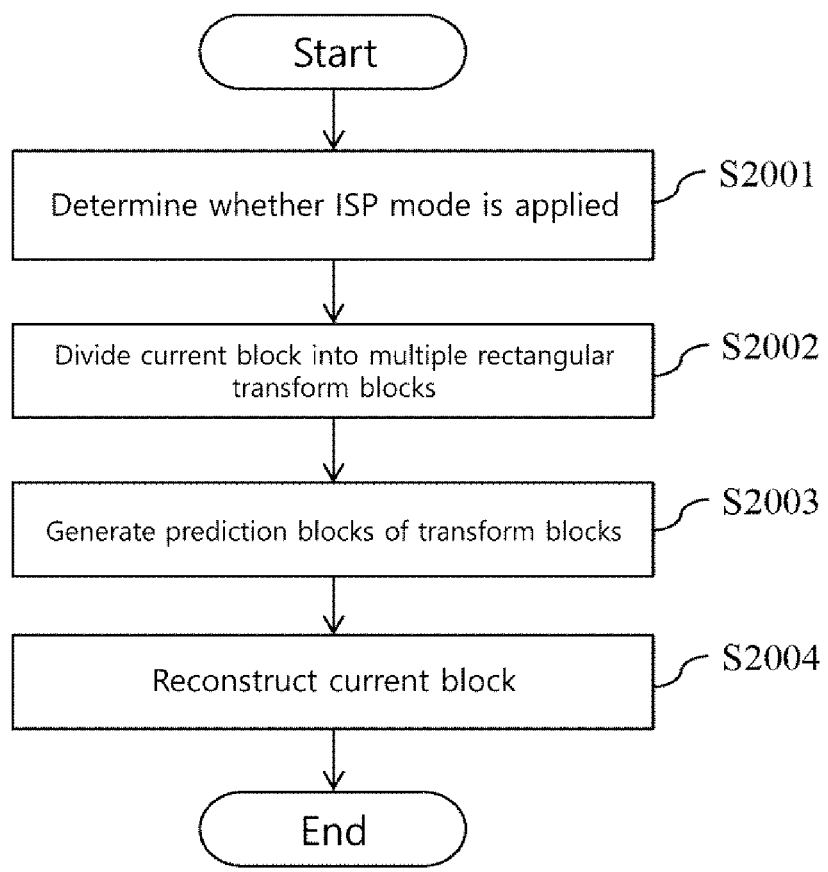
FIG. 20 is a flowchart illustrating a video signal processing method according to an embodiment of the present disclosure.

FIG. 20 is a flowchart illustrating a video signal processing method according to an embodiment of the present disclosure. Referring to FIG. 20, for convenience of explanation, a description will be given mainly for the decoder, but the present disclosure is not limited thereto. A video signal processing method according to the present embodiment may also be applied to the encoder by a substantially identical method.

Referring to FIG. 20, the decoder determines whether an intra sub-partition (ISP) mode is applied to a current block (S2001).

If the ISP mode is applied to the current block, the decoder divides the current block into multiple horizontal or vertical rectangular transform blocks (S2002).

The decoder generates prediction blocks of the transform blocks by performing intra prediction on each of the transform blocks (S2003).

The decoder reconstructs the current block, based on residual blocks of the transform blocks and the prediction blocks (S2004).

As described above, the generating of the prediction blocks may include performing position-dependent intra prediction sample filtering in a unit of the transform blocks obtained by dividing the current block.

In addition, as described above, the generating of the prediction blocks may further include determining whether to apply the position-dependent intra prediction sample filtering, based on at least one of a width and a height of each of the transform blocks.

In addition, As described above, the determining of whether to apply the position-dependent intra prediction sample filtering may include, if the width of each of the transform blocks is equal to or larger than a pre-configured reference value, and the height of each of the transform blocks is equal to or larger than the pre-configured reference value, determining to apply the position-dependent intra prediction sample filtering.

In addition, as described above, the residual blocks of the transform blocks may be derived by performing an inverse secondary transform and an inverse primary transform in a unit of the transform blocks.

In addition, as described above, the method may further include: determining whether a secondary transform is applied to the current block; when the secondary transform is applied to the current block, deriving a secondary transform kernel set applied to the current block among secondary transform kernel sets which are predefined based on an intra prediction mode of the current block; determining a secondary transform kernel applied to the current block in the determined secondary transform kernel set; generating secondary-inverse-transformed blocks of the transform blocks by performing an inverse secondary transform in a unit of the transform blocks to; and generating the residual blocks of the transform blocks by performing an inverse primary transform on the secondary-inverse-transformed blocks.

The above-described embodiments of the present invention can be implemented through various means. For example, embodiments of the present invention may be implemented by hardware, firmware, software, or a combination thereof.

For implementation by hardware, the method according to embodiments of the present invention may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In the case of implementation by firmware or software, the method according to embodiments of the present invention may be implemented in the form of a module, procedure, or function that performs the functions or operations described above. The software code can be stored in memory and driven by a processor. The memory may be located inside or outside the processor, and may exchange data with the processor by various means already known.

Some embodiments may also be implemented in the form of a recording medium including computer-executable instructions such as a program module that is executed by a computer. Computer-readable media may be any available media that may be accessed by a computer, and may include all volatile, nonvolatile, removable, and non-removable media. In addition, the computer-readable media may include both computer storage media and communication media. The computer storage media include all volatile, nonvolatile, removable, and non-removable media implemented in any method or technology for storing information such as computer-readable instructions, data structures, program modules, or other data. Typically, the communication media include computer-readable instructions, other data of modulated data signals such as data structures or program modules, or other transmission mechanisms, and include any information transfer media.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

INDUSTRIAL APPLICABILITY

The aforementioned preferred embodiments of the present disclosure have been disclosed for illustrative purposes, and those skilled in the art may improve, change, substitute, or add various other embodiments without departing from the technological spirit and scope of the present disclosure disclosed in the attached claims.

The invention claimed is:

1. A non-transitory computer-readable medium storing a bitstream, the bitstream being decoded by a decoding method,
wherein the decoding method, comprises:
determining whether an intra sub-partition (ISP) mode is applied to a current block;
when the ISP mode is applied to the current block, dividing the current block into a plurality of transform blocks based on a horizontal direction or a vertical direction;
wherein the plurality of transform blocks include a first transform block and a second transform block;
generating a first prediction block of the first transform block and a second prediction block of the second transform block; and
reconstructing the current block based on a first residual block, a second residual block, the first prediction block, and the second prediction block,
wherein the first residual block is a residual block of the first transform block and the second residual block is a residual block of the second transform block,
wherein the first residual block and the second residual block are obtained by performing a low frequency non-separable transform on each of the first transform block and the second transform block,
wherein the first prediction block and the second prediction block are generated by applying position-dependent intra prediction sample filtering.

2. The non-transitory computer-readable medium of claim 1,
wherein whether the position-dependent intra prediction sample filtering is applied based on at least one of a width and a height of each of the transform blocks.

3. The non-transitory computer-readable medium of claim 2, wherein the width of each of the transform blocks is equal to or larger than a pre-configured reference value, and the height of each of the transform blocks is equal to or larger than the pre-configured reference value.

4. The non-transitory computer-readable medium of claim 1,
wherein the position-dependent intra prediction sample filtering is applied by weighted combination of reference samples of each of the transform blocks.

5. The non-transitory computer-readable medium of claim 1,
wherein a transform kernel for the low frequency non-separable transform is determined based on an intra prediction mode of the current block.

6. A device for decoding a video signal, the device comprising a processor,
wherein the processor is configured to:
determine whether an intra sub-partition (ISP) mode is applied to a current block;
when the ISP mode is applied to the current block, divide the current block into multiplea plurality of transform blocks based on a horizontal direction ora vertical direction, rectangular transform blocks;
wherein the plurality of transform blocks include a first transform block and a second transform block,
generate a first prediction block of the first transform block and a second prediction block of the second transform block, and
reconstruct the current block based on a first residual block, a second residual block, the first prediction block, and the second prediction block,
wherein the first residual block is a residual block of the first transform block and the second residual block is a residual block of the second transform block,
wherein the first residual block and the second residual block are obtained by performing a low frequency non-separable transform on each of the first transform block and the second transform block,
wherein the first prediction block and the second prediction block are generated by applying position-dependent intra prediction sample filtering.

7. The device of claim 6,
wherein whether the position-dependent intra prediction sample filtering is applied based on at least one of a width and a height of each of the transform blocks.

8. The device of claim 7,
wherein the width of each of the transform blocks is equal to or larger than a pre-configured reference value, and the height of each of the transform blocks is equal to or larger than the pre-configured reference value.

9. The device of claim 6,
wherein the position-dependent intra prediction sample filtering is applied by weighted combination of reference samples of each of the transform blocks.

10. The device of claim 6,
wherein a transform kernel for the low frequency non-separable transform is determined based on an intra prediction mode of the current block.

11. A device for encoding a video signal, the device comprising a processor,
wherein the processor is configured to
obtain a bitstream to be decoded by a decoder using a decoding method, wherein the decoding method comprises:
determining whether an intra sub-partition (ISP) mode is applied to a current block;
when the ISP mode is applied to the current block, dividing the current block into plurality of transform blocks based on a horizontal direction or a vertical direction,
wherein the plurality of transform blocks include a first transform block and a second transform block;
generating a first prediction block of the first transform block and a second prediction block of the second transform block; and
reconstructing the current block based on a first residual block, a second residual block, the first prediction block, and the second prediction block,
wherein the first residual block is a residual block of the first transform block and the second residual block is a residual block of the second transform block,
wherein the first residual block and the second residual block are obtained by performing a low frequency non-separable transform on each of the first transform block and the second transform block,
wherein the first prediction block and the second prediction block are generated by applying position-dependent intra prediction sample filtering.

12. The device of claim 11, wherein whether the position-dependent intra prediction sample filtering is applied based on at least one of a width and a height of each of the transform blocks.

13. The device of claim of 12,
wherein the width of each of the transform blocks is equal to or larger than a pre-configured reference value, and the height of each of the transform blocks is equal to or larger than the pre-configured reference value.

14. The device of claim of 11,
wherein the position-dependent intra prediction sample filtering is applied by weighted combination of reference samples of each of the transform blocks.

15. The device of claim of 11, wherein a transform kernel for the low frequency non-separable transform is determined based on an intra prediction mode of the current block.

* * * * *

UNITED STATES PATENT AND TRADEMARK OFFICE
CERTIFICATE OF CORRECTION

PATENT NO. : 11,979,554 B2  
APPLICATION NO. : 17/401923  
DATED : May 7, 2024  
INVENTOR(S) : Dongcheol Kim et al.

Page 1 of 1

It is certified that error appears in the above-identified patent and that said Letters Patent is hereby corrected as shown below:

In the Claims

- In Column 28, Line 37 of Claim 6, the word "multiplea" should be changed to "a".

- In Column 28, Line 38 of Claim 6, the word "ora" should be changed to "or a".

- In Column 28, Line 39 of Claim 6, the phrase "rectangular transform blocks;" should be deleted.

Signed and Sealed this  
Eighth Day of April, 2025

Coke Morgan Stewart  
*Acting Director of the United States Patent and Trademark Office*